US010805548B2

(12) United States Patent
Koizumi et al.

(10) Patent No.: US 10,805,548 B2
(45) Date of Patent: Oct. 13, 2020

(54) SIGNAL PROCESSING APPARATUS, IMAGING APPARATUS, AND SIGNAL PROCESSING METHOD

(71) Applicant: Sony Semiconductor Solutions Corporation, Kanagawa (JP)

(72) Inventors: Makoto Koizumi, Kanagawa (JP); Masakatsu Fujimoto, Kanagawa (JP); Ikko Okamoto, Kanagawa (JP); Daiki Yamazaki, Kanagawa (JP); Yasushi Shibata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/316,075

(22) PCT Filed: Jun. 30, 2017

(86) PCT No.: PCT/JP2017/024105
§ 371 (c)(1),
(2) Date: Jan. 8, 2019

(87) PCT Pub. No.: WO2018/012317
PCT Pub. Date: Jan. 18, 2018

(65) Prior Publication Data
US 2019/0335079 A1    Oct. 31, 2019

(30) Foreign Application Priority Data

Jul. 15, 2016  (JP) ................................. 2016-140919
Sep. 16, 2016  (JP) ................................. 2016-181496

(51) Int. Cl.
*H04N 5/235*   (2006.01)
*H04N 5/232*   (2006.01)

(52) U.S. Cl.
CPC ......... *H04N 5/2353* (2013.01); *H04N 5/2351* (2013.01)

(58) Field of Classification Search
CPC ... H04N 5/2353; H04N 5/2351; H04N 5/2356
See application file for complete search history.

(56) References Cited

U.S. PATENT DOCUMENTS

2013/0271623 A1* 10/2013 Jo ........................ H04N 5/2357
                                                                    348/226.1
2017/0195604 A1*  7/2017 Shen .................. H04N 5/35581

FOREIGN PATENT DOCUMENTS

JP    05-064075 A    3/1993
JP    2003-009006 A  1/2003
(Continued)

OTHER PUBLICATIONS

International Written Opinion and English translation thereof dated Sep. 19, 2017 in connection with International Application No. PCT/JP2017/024105.

(Continued)

*Primary Examiner* — Christopher K Peterson
(74) *Attorney, Agent, or Firm* — Wolf, Greenfield & Sacks, P.C.

(57) ABSTRACT

The present technology relates to a signal processing apparatus, an imaging apparatus, and a signal processing method capable of reliably imaging a blinking imaging target in a scene having a very large difference in brightness. By detecting a difference between a plurality of images captured with different exposure times, calculating a combination coefficient indicating a combination ratio between the plurality of images on the basis of the difference, and combining the plurality of images on the basis of the combination coefficient, it is possible to reliably image a blinking imaging target in a scene having a very large difference in (Continued)

brightness. The present technology can be applied to, for example, a camera unit that captures an image.

11 Claims, 29 Drawing Sheets

(56) References Cited

FOREIGN PATENT DOCUMENTS

| | | |
|---|---|---|
| JP | 2007-161189 A | 6/2007 |
| JP | 2010-178164 A | 8/2010 |
| JP | 2011-234318 A | 11/2011 |
| JP | 2012-231273 A | 11/2012 |

OTHER PUBLICATIONS

International Preliminary Report on Patentability and English translation thereof dated Jan. 24, 2019 in connection with International Application No. PCT/JP2017/024105.

International Search Report and English translation thereof dated Sep. 19, 2017 in connection with International Application No. PCT/JP2017/024105.

* cited by examiner

SIGNAL PROCESSING APPARATUS, IMAGING APPARATUS, AND SIGNAL PROCESSING METHOD

CROSS-REFERENCE TO RELATED APPLICATIONS

This application claims the benefit under 35 U.S.C. § 371 as a U.S. National Stage Entry of International Application No. PCT/JP2017/024105, filed in the Japanese Patent Office as a Receiving Office on Jun. 30, 2017, which claims priority to Japanese Patent Application Number JP2016-181496, filed in the Japanese Patent Office on Sep. 16, 2016, and Japanese Patent Application Number JP2016-140919, filed in the Japanese Patent Office on Jul. 15, 2016, each of which is hereby incorporated by reference in its entirety.

TECHNICAL FIELD

The present technology relates to a signal processing apparatus, an imaging apparatus, and a signal processing method and in particular, to a signal processing apparatus, an imaging apparatus, and a signal processing method capable of reliably imaging a blinking imaging target, for example, in a scene having a very large difference in brightness.

BACKGROUND ART

In recent years, there are an increasing number of cases where in-vehicle cameras are mounted in automobiles in order to realize advanced driving control, such as automatic driving.

However, in order to ensure safety, in-vehicle cameras are requested to ensure visibility even under conditions in which the brightness difference is very large, such as at the exit of a tunnel. Therefore, a technology for suppressing whiteout of an image to increase the dynamic range is required. As a countermeasure against such whiteout, for example, a technology disclosed in Patent Literature 1 is known.

Note that, in recent years, light sources of traffic signals or electronic road signs are being replaced with Light Emitting Diodes (LEDs) from incandescent bulbs and the like.

Compared with incandescent bulbs, LEDs have a high response speed of blinking. Accordingly, for example, when an LED traffic signal or an LED road sign is imaged by an in-vehicle camera or the like mounted in an automobile or the like, a flicker occurs, and the traffic signal or the road sign is imaged in a state in which the traffic signal or the road sign is turned off. As a countermeasure against such a flicker, for example, a technology disclosed in Patent Literature 2 is known.

CITATION LIST

Patent Literature

Patent Literature 1: JP-A-5-64075
Patent Literature 2: JP-A-2007-161189

DISCLOSURE OF INVENTION

Technical Problem

Incidentally, since a technology for reliably imaging LED traffic signals, LED road signs, and the like having a high response speed of blinking in a scene having a very large difference in brightness, such as at the exit of a tunnel, has not been established, such a technology has been demanded.

The present technology has been made in view of such a situation, and makes it possible to reliably image a blinking imaging target in a scene having a very large difference in brightness.

Solution to Problem

A signal processing apparatus according to an aspect of the present technology is a signal processing apparatus including: a detection unit that detects a difference between a plurality of images captured with different exposure times; a combination coefficient calculation unit that calculates a combination coefficient indicating a combination ratio between the plurality of images on the basis of the difference; and a combination unit that combines the plurality of images on the basis of the combination coefficient.

An imaging apparatus according to an aspect of the present technology is an imaging apparatus including: an image generation unit that generates a plurality of images captured with different exposure times; a detection unit that detects a difference between the plurality of images; a combination coefficient calculation unit that calculates a combination coefficient indicating a combination ratio between the plurality of images on the basis of the difference; and a combination unit that combines the plurality of images on the basis of the combination coefficient.

A signal processing method according to an aspect of the present technology is a signal processing method including: detecting a difference between a plurality of images captured with different exposure times; calculating a combination coefficient indicating a combination ratio between the plurality of images on the basis of the difference; and combining the plurality of images on the basis of the combination coefficient.

In the signal processing apparatus, the imaging apparatus, and the signal processing method according to an aspect of the present technology, the difference between a plurality of images captured with different exposure times is detected, the combination coefficient indicating the combination ratio between the plurality of images is calculated on the basis of the difference, and the plurality of images are combined on the basis of the combination coefficient.

The signal processing apparatus or the imaging apparatus may be an independent apparatus, or may be an internal block that forms one apparatus.

Advantageous Effects of Invention

According to one aspect of the present technology, it is possible to reliably image a blinking imaging target in a scene having a very large difference in brightness.

Note that, the effect described herein is not necessarily limited, and may be any of the effects described in the present disclosure.

MODE(S) FOR CARRYING OUT THE INVENTION

Hereinafter, an embodiment of the present technology will be described with reference to the diagrams. Note that, the description will be given in the following order.

1. Outline of the Present Technology
2. Embodiment of the Present Technology
3. Modification Example of Embodiment of the Present Technology
4. Detailed Contents of Signal Processing of the Present Technology
5. Configuration Example of Solid State Imaging Device
6. Configuration Example of Computer
7. Application Example <1. Outline of the Present Technology>

(Example of Imaging of an Imaging Target Having a Very Large Difference in Brightness)

In recent years, there are an increasing number of cases where in-vehicle cameras are mounted in automobiles in order to realize advanced driving control, such as automatic driving. However, in order to ensure safety, in-vehicle cameras are requested to ensure visibility even under conditions in which the brightness difference is very large, such as at the exit of a tunnel. Therefore, a technology for suppressing whiteout of an image to increase the dynamic range is required.

Figure 1:
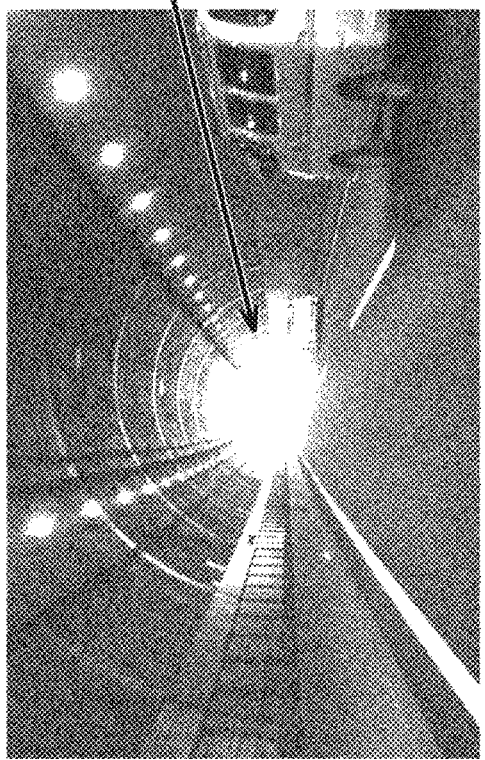
FIG. 1 is a diagram describing an example of imaging of an imaging target having a very large difference in brightness.

FIG. 1 is a diagram describing an example of imaging of an imaging target having a very large difference in brightness. In FIG. 1, an example of imaging of the exit of a tunnel is shown, but driving control for ensuring safety cannot be performed unless the situation at the exit of the tunnel can be recognized.

(Example of Imaging of a Blinking Imaging Target)

Note that, in recent years, light sources of traffic signals or signs are being replaced with LEDs from light bulbs. However, since the response speed of blinking of the LED is higher than that of the conventional light bulb, there is a problem that a flicker occurs to turn off the LED traffic signal or the LED sign when the LED traffic signal or the LED sign is imaged by an imaging apparatus. This is a big problem in securing the evidence of a drive recorder or in automating the driving of automobiles.

Figure 2:
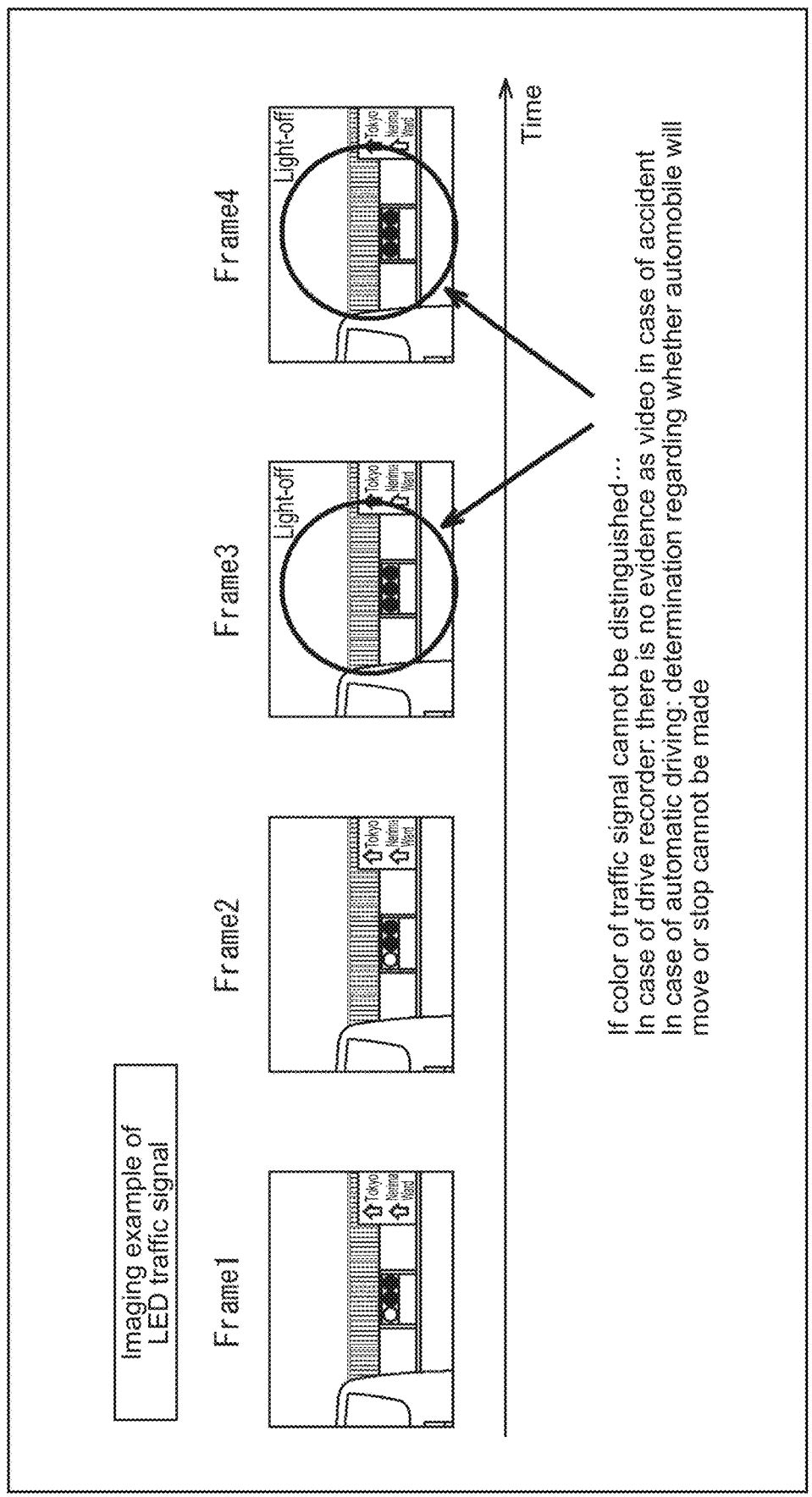
FIG. 2 is a diagram describing an example of imaging of a blinking imaging target.

FIG. 2 is a diagram describing an example of imaging of a blinking imaging target. In FIG. 2, in images of the first frame (Frame1) and the second frame (Frame2), a traffic signal in which blue (left end) is lit is reflected. In images of the third frame (Frame3) and the fourth frame (Frame4), a traffic signal that is turned off is reflected.

Being reflected in a state in which the traffic signal is turned off as described above becomes a cause of adversely affecting the evidence of a video (image), for example, in a case where the image is used for the drive recorder. Note that, being reflected in a state in which the traffic signal is turned off becomes a cause of adversely affecting driving control, such as stopping of an automobile, for example, in a case where the image is used for automatic driving of an automobile.

(Method of Coping with a Blinking Imaging Target in a Scene Having a Very Large Difference in Brightness)

Figure 3:
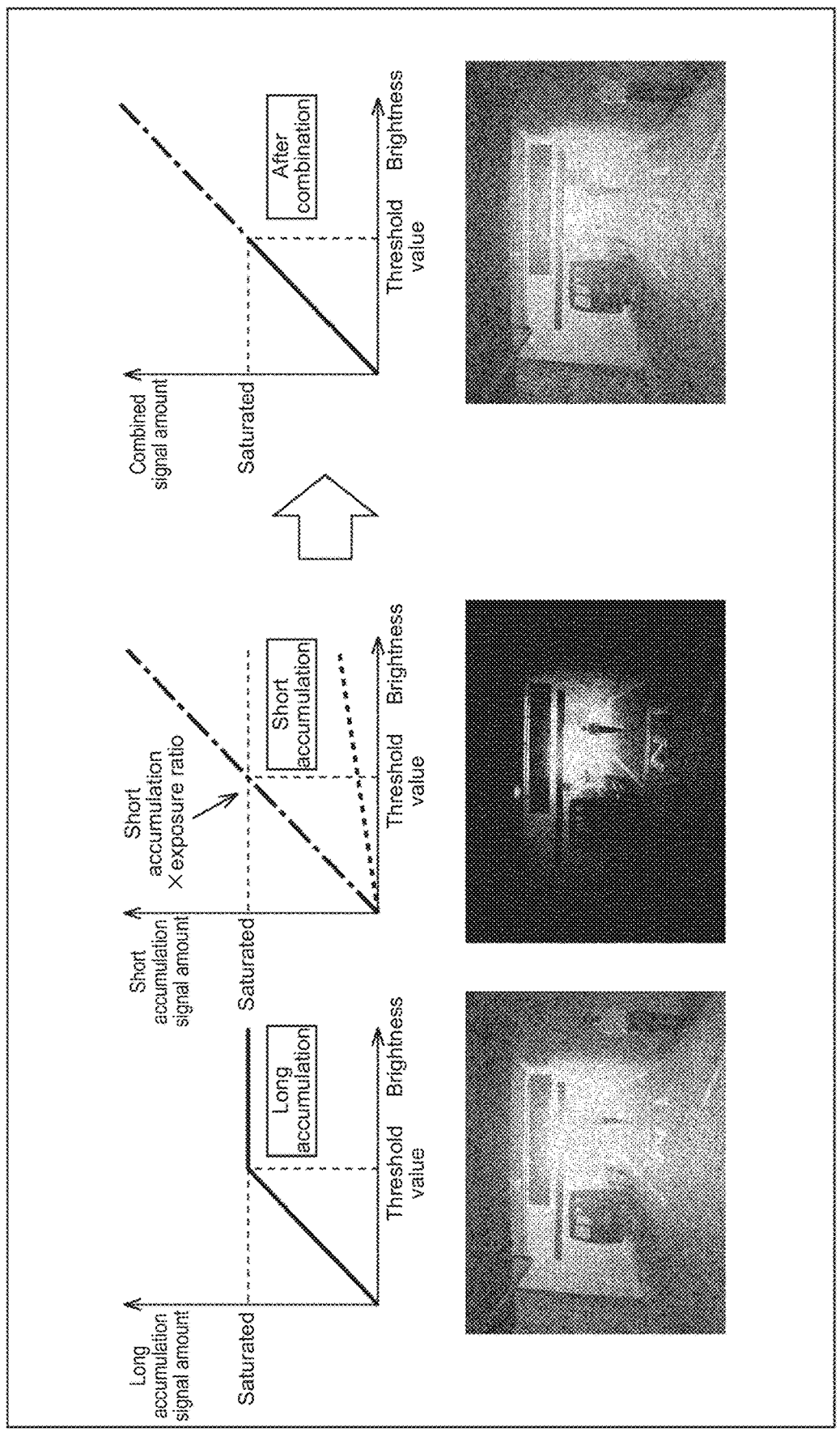
FIG. 3 is a diagram describing a method of coping with an imaging target having a very large difference in brightness.

Here, the above-described Patent Literature 1 has proposed a method of increasing the apparent dynamic range by suppressing whiteout by combining images captured with a plurality of different exposure amounts. In this method, as shown in FIG. 3, with reference to the brightness value of a long-time exposure image (long accumulation image) having a long exposure time, it is possible to generate an image having a wide dynamic range by outputting a long-time exposure image (long accumulation image) when the brightness falls below a predetermined threshold value and a short-time exposure image (short accumulation image) when the brightness exceeds the predetermined threshold value.

Figure 4:
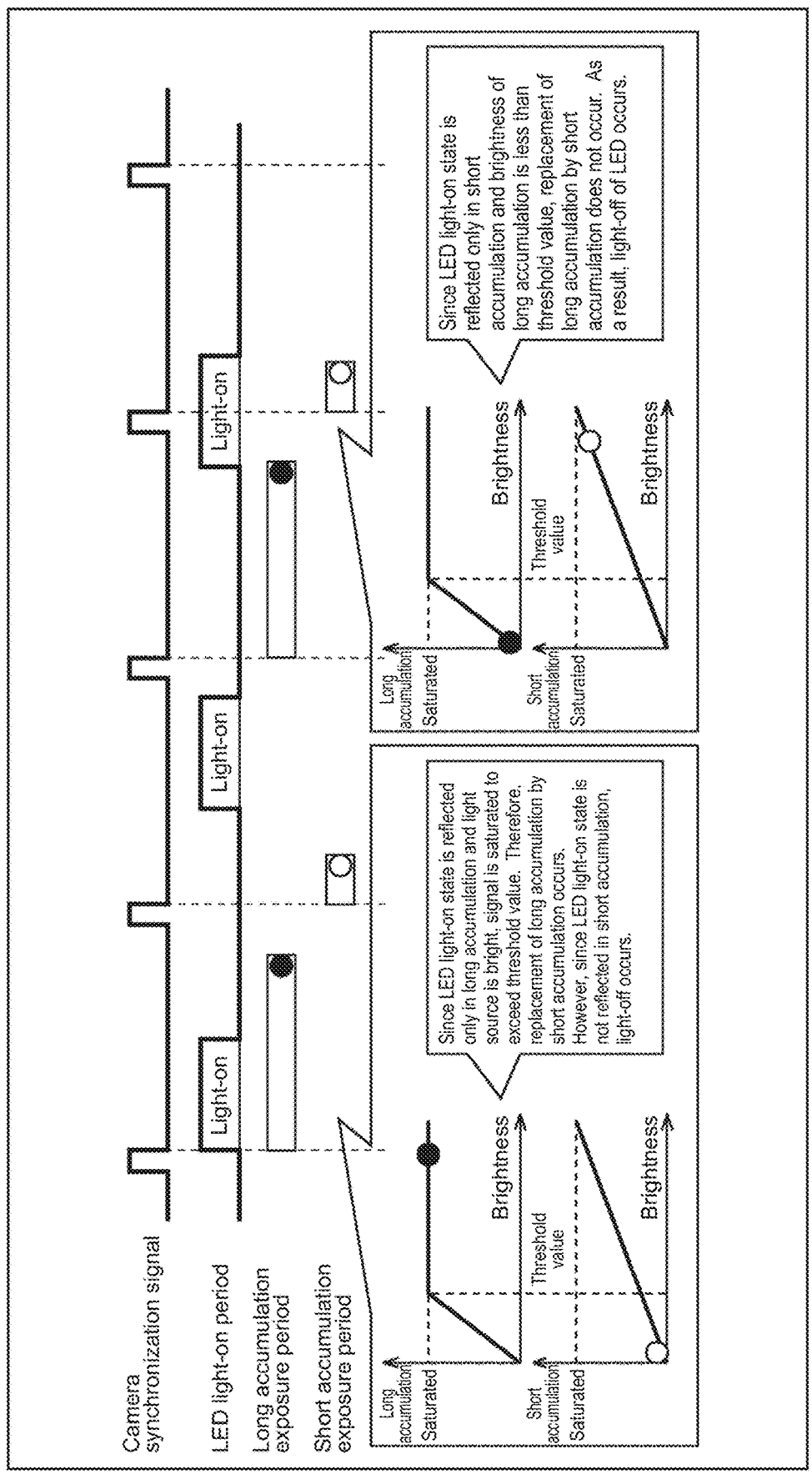
FIG. 4 is a diagram illustrating an example of a case where a light-off state is recorded even though a light-on state of a traffic signal is to be recorded.

On the other hand, as illustrated in FIG. 2, in a case where a high-brightness subject, such as an LED traffic signal, is blinking, a light-off state may be recorded, even though a light-on state of the traffic signal is to be originally recorded, by combining a long-time exposure image (long accumulation image) and a short-time exposure image (short accumulation image). FIG. 4 illustrates an example of the case where the light-off state is recorded even though the light-on state of the traffic signal is to be recorded.

In the example illustrated in FIG. 4, in a case where the LED light-on state is reflected only in the long accumulation image, since the light source is bright, the signal is saturated to exceed the threshold value. Therefore, in the short accumulation image, replacement of the long accumulation image by the short accumulation image occurs. However, since the LED light-on state is not reflected in the short accumulation image, a light-off state occurs. Note that, in the example illustrated in FIG. 4, in a case where the LED light-on state is reflected only in the short accumulation image, the brightness of the long accumulation image is less than the threshold value. Accordingly, replacement of the long accumulation image by the short accumulation image does not occur. As a result, since the light-on state of the LED is not reflected in the long accumulation image, a light-off state occurs.

Figure 5:
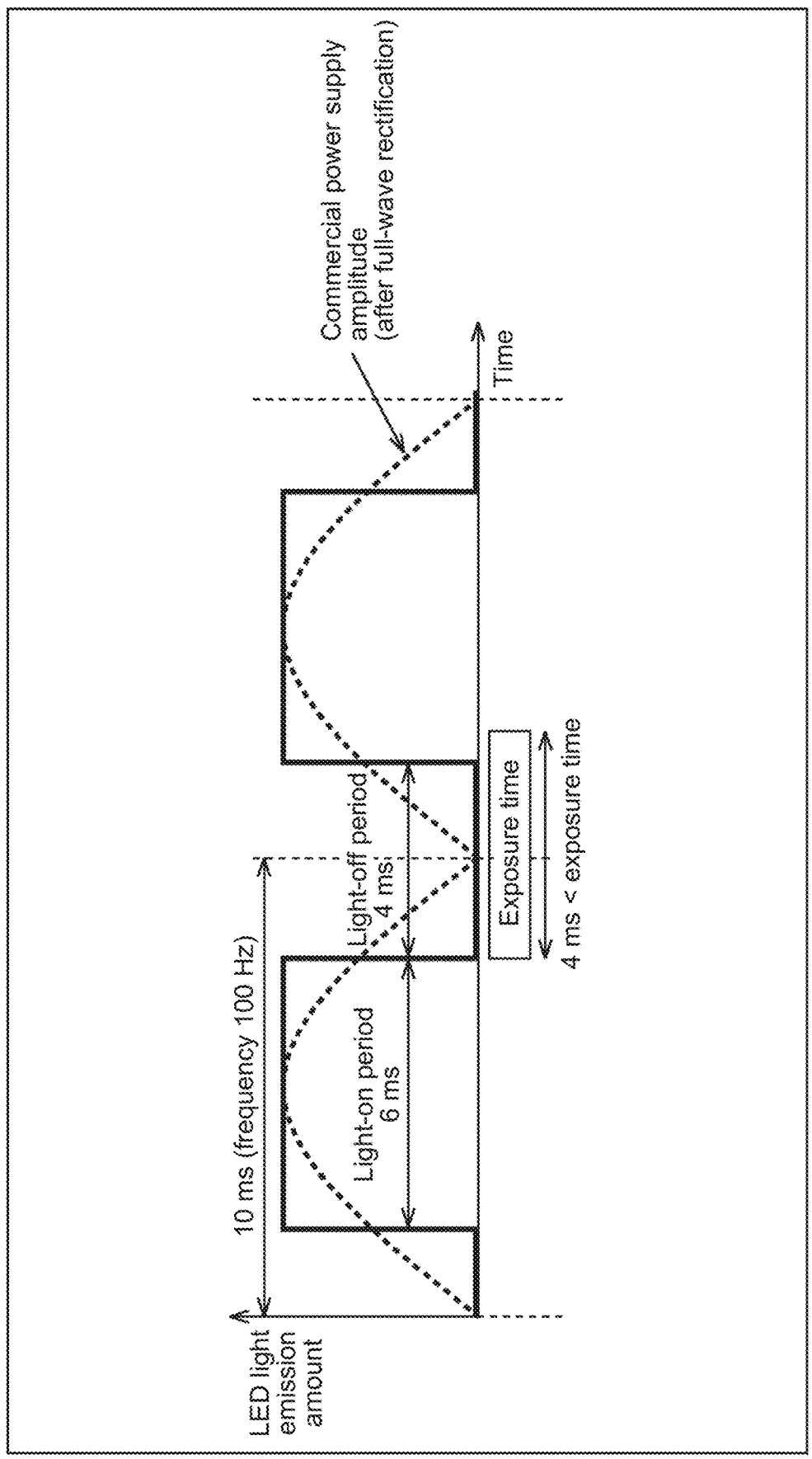
FIG. 5 is a diagram illustrating an example of a case where imaging is performed for an exposure time exceeding the light-off period of a blinking light source.

Note that, for a flicker of the LED illustrated in FIG. 2, there is a method of preventing imaging missing in a light emitting period by performing imaging with an exposure time exceeding the light-off period of a blinking light source. For example, if the blinking cycle of the light source is 100 Hz and the light emission duty ratio is 60%, it is possible to keep imaging the light-on state of the light source by always securing the exposure time equal to or longer than 4 ms with the light-off period of 4 ms as the lower limit value of the exposure time (refer to Patent Literature 2 described above). FIG. 5 illustrates an example of the case where imaging is performed for an exposure time exceeding the light-off period of the blinking light source. In the example illustrated in FIG. 5, in a case where the light-off period is 4 ms, 4 ms<exposure time is set.

However, in the case of a system in which a lens F value is fixedly used, such as an in-vehicle camera, the exposure time cannot be made shorter than the light-off period of the light source under the conditions of high illuminance, such as outdoors in fine weather. For this reason, since the exposure becomes excessive, the visibility of the subject is lowered. Therefore, in a scene having a large difference in brightness, such as the occurrence of whiteout of the image shown in FIG. 1, the effect of increasing the dynamic range of the image cannot be obtained.

Note that, for the flicker of the LED illustrated in FIG. 2, there is a method in which N pieces of imaging data are acquired by performing imaging N times at timings, which are obtained by dividing the blinking cycle of the light source into N equal parts, in an imaging element and then the average value or the maximum value of these images is selected.

By using this method, it is possible to suppress recording of the light-off state of the LED, for example, by performing imaging three times at timings obtained by dividing the blinking cycle 10 ms of the light source blinking at 100 Hz into three equal parts and selecting the average value or the maximum value of the three pieces of imaging data.

Figure 6:
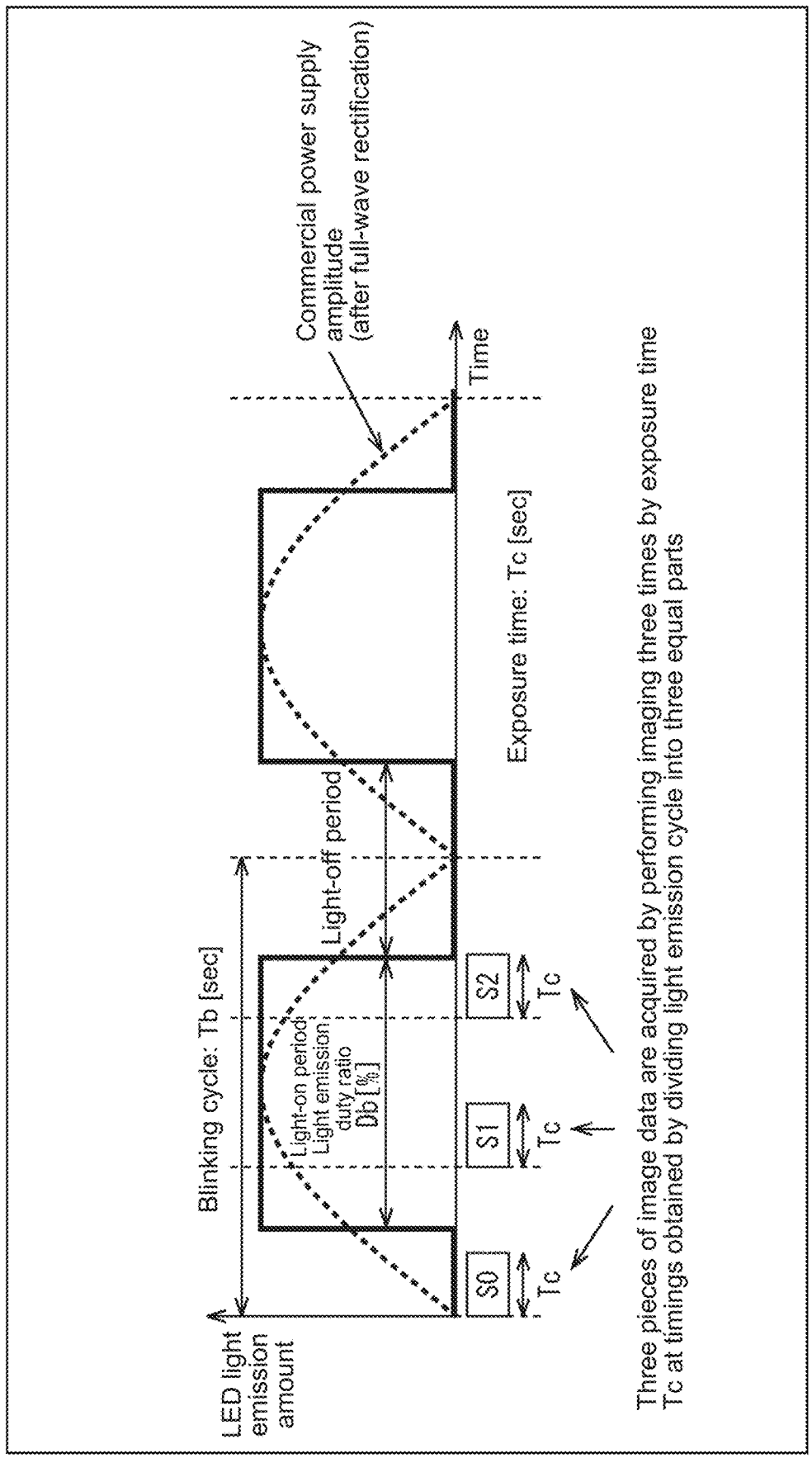
FIG. 6 is a diagram illustrating an example of a case of acquiring N pieces of imaging data by performing imaging N times at timings obtained by dividing the blinking cycle of a light source into N equal parts.

FIG. 6 illustrates an example of the case of acquiring N pieces of imaging data by performing imaging N times at timings obtained by dividing the blinking cycle of the light source into N equal parts. In FIG. 6, a case is exemplified in which imaging is performed three times at timings obtained by dividing the blinking cycle into three equal parts for a light source having a blinking cycle (Tb). Note that, in FIG. 6, S0, S1, and S2 indicate exposure timings when performing imaging three times within one frame. The exposure time (Tc) in each exposure is the same.

Assuming that the exposure start time of S0 is 0, the exposure timings of S0, S1, and S2 are as follows.

Exposure start time of $S0$: 0, Exposure end time of $S0$: $0+Tc$

Exposure start time of $S1$: $Tb/3$, Exposure end time of $S1$: $Tb/3+Tc$

Exposure start time of $S2$:$(Tb/3) \times 2$, Exposure end time of $S2$:$(Tb/3) \times 2+Tc$ However, the method illustrated in FIG. 6 is a technology based on the premise that the respective exposure times are the same when performing imaging a plurality of times. Therefore, the method illustrated in FIG. 6 has an effect on the flicker of the LED illustrated in FIG. 2, but it is not possible to obtain the effect of increasing the dynamic range of the image in a scene having a large difference in brightness, such as the occurrence of whiteout of the image shown in FIG. 1.

As described above, in the current technology, a technology that enables both increasing the dynamic range of the image and countermeasure against the flicker of the LED illustrated in FIG. 2 in a scene having a large difference in brightness, such as the occurrence of whiteout of the image shown in FIG. 1, has not yet been established. In order to make both possible, the present technology has the following three technical features as points.

(1) In order to increase the dynamic range of a video signal, when performing imaging with a plurality of different exposure amounts in an imaging element, the effective exposure time is increased by performing exposure control to make the imaging periods as close as possible to each other, so that the blinking cycle of a high-speed blinking subject, such as an LED, can be easily captured.

(2) When combining a plurality of images captured with different exposure amounts in a signal processing unit, the maximum value of each image considering the exposure ratio is blended according to the difference amount of pixel values of the same coordinates. At that time, motion determination is performed taking the amount of noise into consideration.

(3) By combining the above-described exposure control and signal processing, there is provided an imaging apparatus capable of correctly outputting the light-on state of the high-speed blinking subject, such as an LED traffic signal, while suppressing whiteout and blackout even in a scene having a large difference in brightness.

Since the present technology has such technical features, it is possible to reliably image the imaging target that blinks (blinks at high speed) in a scene having a very large difference in brightness. As a result, in a scene having a large difference in brightness, such as the occurrence of whiteout of the image shown in FIG. 1, it is possible to realize both increasing the dynamic range of the image and countermeasure against the flicker of the LED illustrated in FIG. 2.

Hereinafter, the technical features of the present technology will be described with reference to specific embodiments.

<2. Embodiment of the Present Technology>
(Configuration Example of a Camera Unit)

Figure 7:
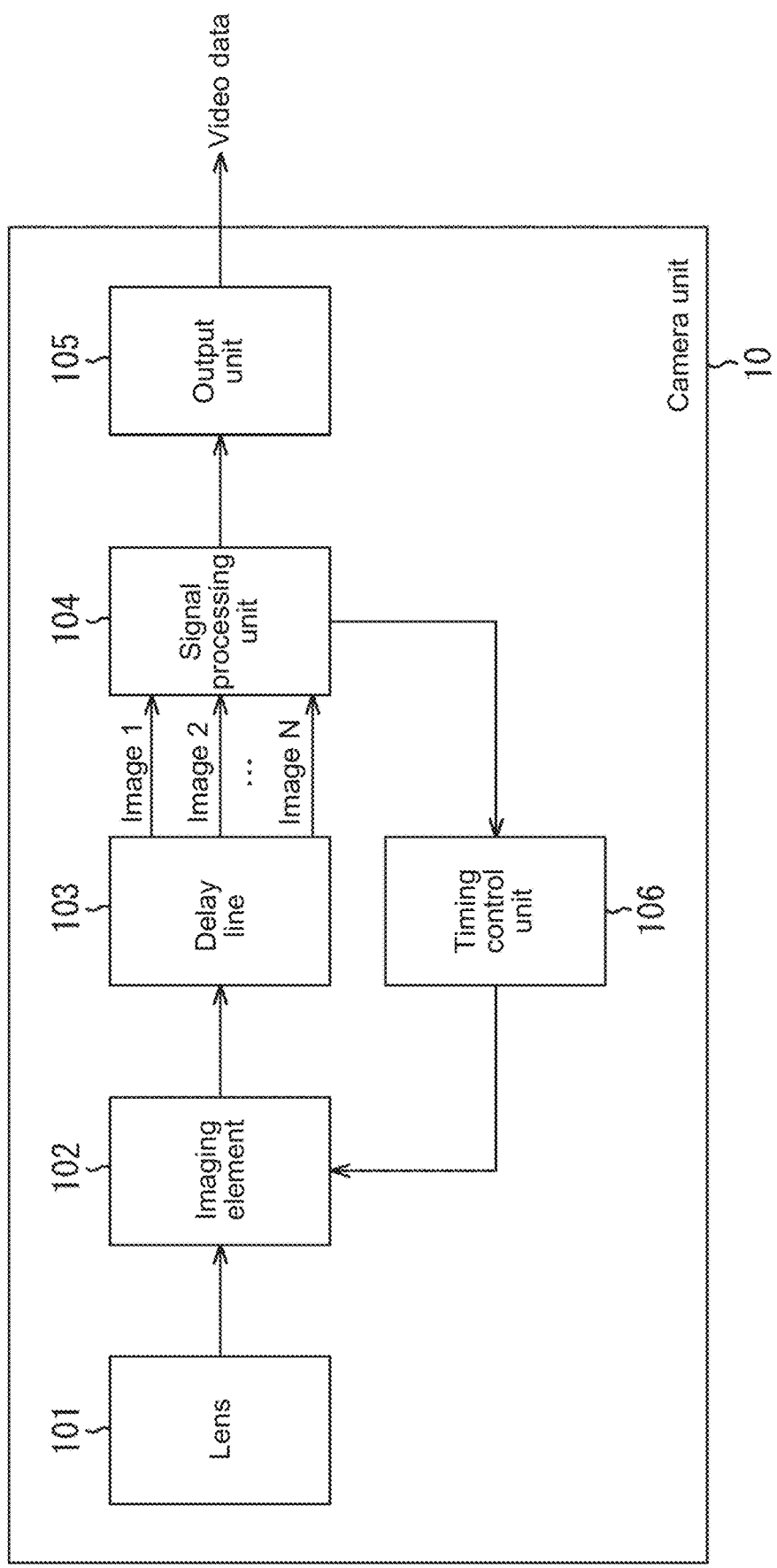
FIG. 7 is a block diagram illustrating a configuration example of an embodiment of a camera unit as an imaging apparatus to which the present technology is applied.

FIG. 7 is a block diagram illustrating a configuration example of an embodiment of a camera unit as an imaging apparatus to which the present technology is applied.

In FIG. 7, a camera unit 10 is configured to include a lens 101, an imaging element 102, a delay line 103, a signal processing unit 104, an output unit 105, and a timing control unit 106.

The lens 101 condenses light from a subject and makes the light incident on the imaging element 102 to form an image.

The imaging element 102 is, for example, a CMOS (Complementary Metal Oxide Semiconductor) image sensor. The imaging element 102 receives incident light from the lens 101 and performs photoelectric conversion, thereby obtaining (image data of) a captured image corresponding to the incident light.

That is, the imaging element 102 functions as an imaging unit that performs imaging at an imaging timing designated by the timing control unit 106, and performs imaging N times in a period of the frame rate of an output image, which is output from the output unit 105, and sequentially outputs N captured images obtained by the imaging of N times.

The delay line 103 sequentially stores the N captured images, which are sequentially output from the imaging element 102, and supplies the N captured images to the signal processing unit 104 simultaneously.

The signal processing unit 104 processes the N captured images from the delay line 103 to generate an output image of one frame (sheet). At this time, the signal processing unit 104 generates the output image by blending the maximum value of the image data of the N captured images according to the difference amount between the pixel values of the captured images.

Note that, the signal processing unit 104 performs processing, such as removal of noise or adjustment of WB (white balance), on the output image, and supplies the processed output image to the output unit 105. Note that, the signal processing unit 104 detects an exposure level from the brightness of the N captured images from the delay line 103, and supplies the exposure level to the timing control unit 106.

The output unit 105 outputs the output image (video data) from the signal processing unit 104.

The timing control unit 106 controls the imaging timing of the imaging element 102. That is, the timing control unit 106 adjusts the exposure time of the imaging element 102 on the basis of the exposure level detected by the signal processing unit 104. At this time, the timing control unit 106 performs shutter control so that the exposure timings of the N captured images are brought as close as possible to each other.

The camera unit 10 is configured as described above.

(Example of Shutter Control of a Timing Control Unit)

Figure 8:
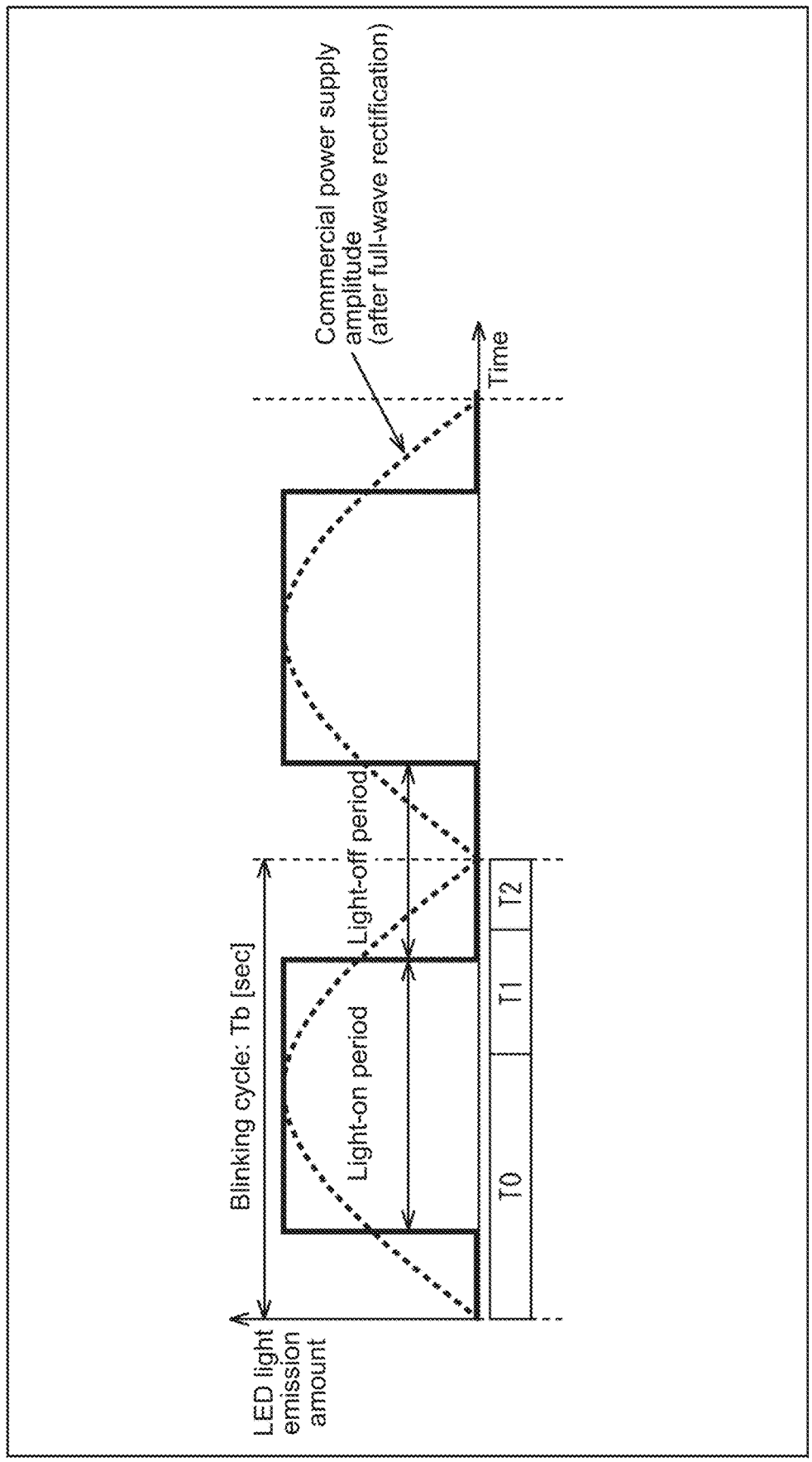
FIG. 8 is a diagram illustrating an example of shutter control of a timing control unit.

Next, shutter control by the timing control unit 106 illustrated in FIG. 7 will be described with reference to FIGS. 8 and 9.

In the camera unit 10 illustrated in FIG. 7, the imaging element 102 acquires imaging data of N captured images having different exposure times. At this time, the timing control unit 106 performs control to increase the effective exposure time by making the imaging periods as close as possible to each other so that it becomes easy to cover the blinking cycle of a high-speed blinking subject, such as an LED.

Here, with reference to FIG. 8, the exposure timing when acquiring three captured images will be described as a specific example thereof. In FIG. 8, T0, T1, and T2 indicate exposure timings when performing imaging three times within one frame. The ratio of the exposure times in respective exposures can be, for example, a ratio of T0:T1:T2=4:2:1 in order to secure the dynamic range of the signal.

At this time, the timing control unit 106 performs exposure timing control so as to start the exposure of T1 as soon as the exposure of T0 is completed and start the exposure of T2 as soon as the exposure of T1 is completed. That is, the interval between the end of exposure of T0 and the start of exposure of T1 and the interval between the end of exposure of T1 and the start of exposure of T2 are minimized. By performing such exposure timing control, the light-on period of the high-speed blinking subject is likely to overlap the exposure period of any of T0, T1, and T2. Therefore, it is possible to increase a probability that an image in the light-on period can be captured.

Note that, the following effects can be obtained by making the imaging periods of the N captured images close to each other. That is, when A of FIGS. 9 and B of FIG. 9 are compared with each other for explanation, as illustrated in A of FIG. 9, in a case where the exposure timings of T0, T1, and T2 are set apart from each other, there is a possibility that the exposure timing and the light emission timing do not overlap each other in the case of a blinking light source having a short light-on period (small light emission duty ratio).

Figure 9:
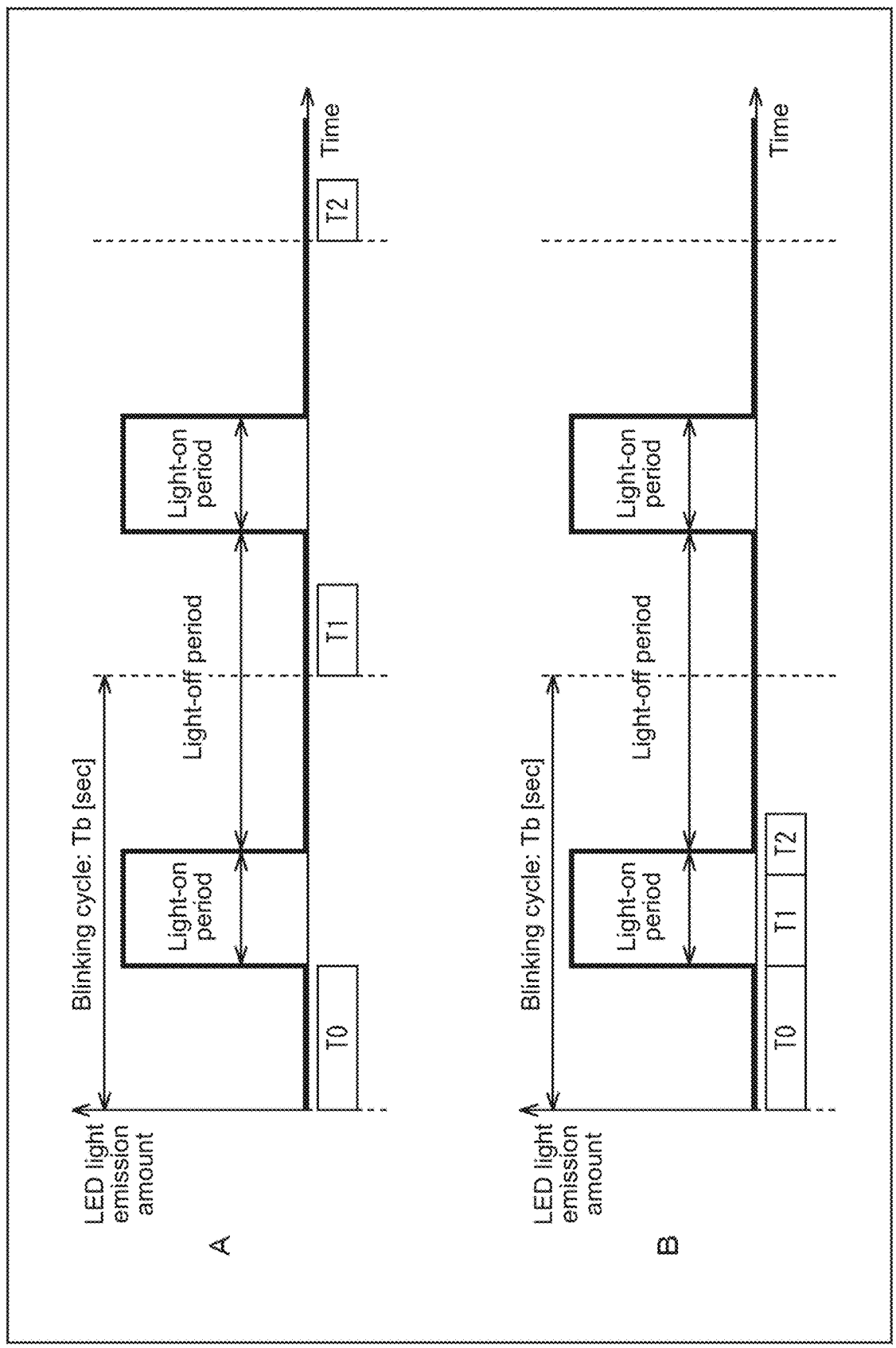
FIG. 9 is a diagram illustrating an example of shutter control of the timing control unit.

On the other hand, as illustrated in B of FIG. 9, in a case where the exposure timings of T0, T1, and T2 are brought close to each other, the effective exposure time is increased. Therefore, it is possible to improve the possibility that the exposure timing and the light emission timing overlap each other for the blinking light source having a short light-on period. Note that, for example, since the light-off period of the LED traffic signal is typically assumed to be about 3 ms, the timing control unit 106 can perform control to make the exposure timings of T0, T1, and T2 close to each other according to the light-off period.

Note that, in a case where the signal processing unit 104 to be described later performs control to output the maximum value of T0, T1, and T2, in the case of imaging a moving object in which the pixel values of T0, T1, and T2 are different, there are cases where artifacts, such as double edge images, are generated. However, by making the exposure timings of T0, T1, and T2 close to each other, it is possible to suppress the apparent motion amount of the moving object to a small value. Therefore, the effect of suppressing the adverse effects of the maximum value output can also be expected.

Note that, the shutter control to make the exposure timings of T0, T1, and T2 close to each other can be realized by using a sensor that is of a type in which a reading operation and a shutter operation between frames temporally overlap each other, for example. Note that, as a related technology, the following Patent Literature 3 is disclosed.

Patent Literature 3: JP-A-2008-22485

However, merely making the N imaging periods close to each other to perform exposure is not sufficient as a countermeasure against the flicker of the LED illustrated in FIG. 2. That is, according to the technology disclosed in Patent Literature 3, for example, in a case where the light-on state of the LED is recorded only in the signal of the first subframe and the pixel value is saturated, the LED is turned off when combination processing for replacing the value with a signal of the second subframe is performed to increase the dynamic range of the signal. Therefore, the configuration of the signal processing unit 104 for preventing the LED from being turned off will be described hereinbelow.

(Configuration Example of a Signal Processing Unit)

Figure 10:
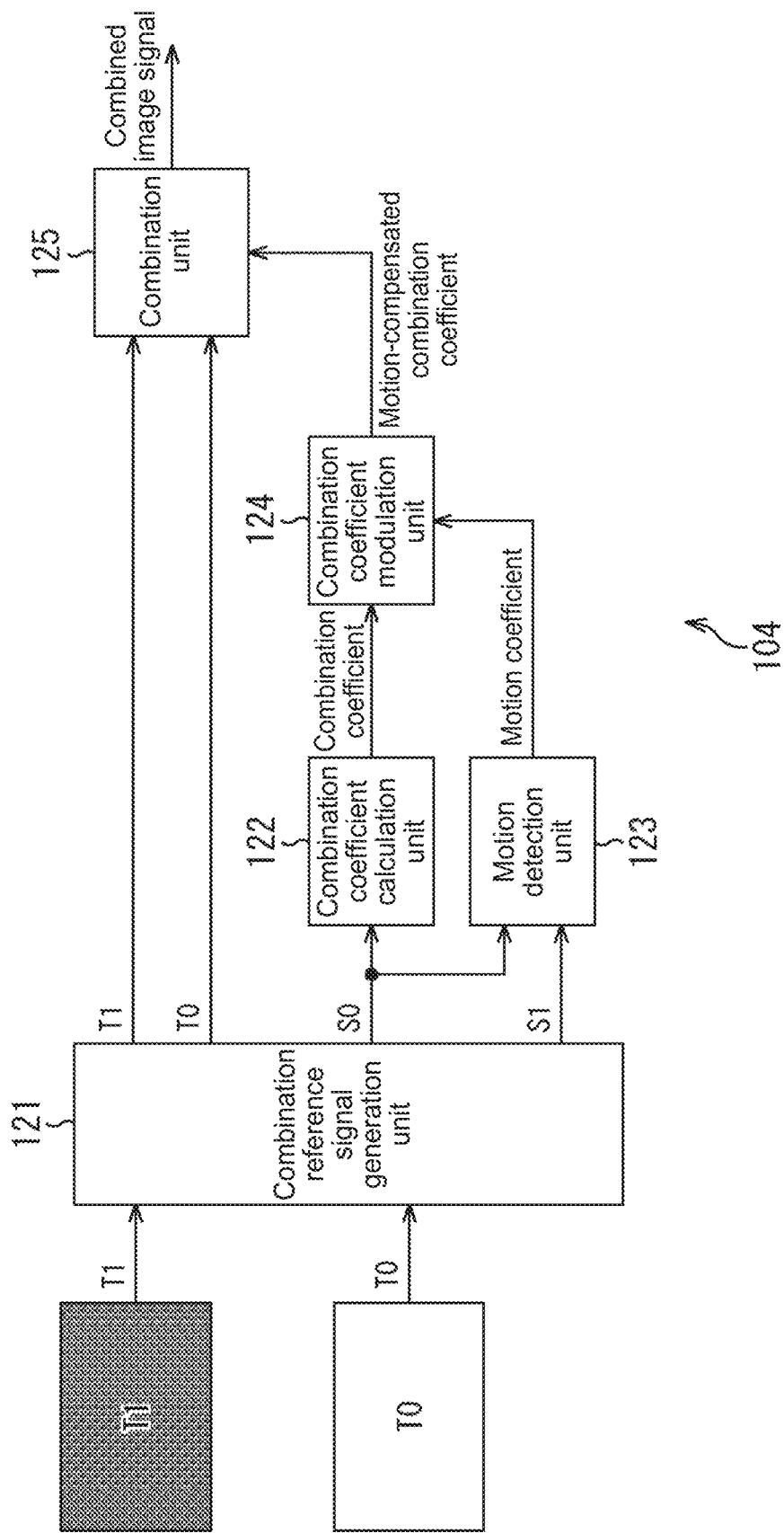
FIG. 10 is a diagram illustrating a configuration example of a signal processing unit.

FIG. 10 is a diagram illustrating a configuration example of the signal processing unit 104 illustrated in FIG. 7.

In the signal processing unit 104 shown in FIG. 10, image data of the N captured images acquired by the imaging element 102 is processed and combined with the output image of one frame (sheet). At this time, the signal processing unit 104 always combines the image data of the N captured images, so that a total of (N−1) combination processes are performed.

In FIG. 10, as the simplest example, signal processing when combining two captured images into one output image will be described.

Note that, in FIG. 10, T0 and T1 indicate captured images corresponding to the respective exposure times when performing imaging twice within one frame. Note that, in FIG. 10, the ratio of the exposure times in respective exposures is assumed to be, for example, a ratio of T0:T1=16:1 in order to secure the dynamic range of the signal. When the exposure ratio gain for adjusting the brightness of T1 to T0 is defined as SGAIN1, SGAIN1=exposure time of T0/exposure time of T1=16 [times]. Hereinafter, captured images corresponding to T0 and T1 will also be described as an image signal T0 and an image signal T1, respectively.

In FIG. 10, the signal processing unit 104 is configured to include a combination reference signal generation unit 121, a combination coefficient calculation unit 122, a motion detection unit 123, a combination coefficient modulation unit 124, and a combination unit 125.

The combination reference signal generation unit 121 generates a signal (a reference signal S0 and a reference signal S1) serving as a reference for combining the image signal T0 and the image signal T1. At this time, the combination reference signal generation unit 121 generates the reference signal S0 from the image signal T0 and the reference signal S1 from the image signal T1. Note that, as a method of generating the reference signals S0 and S1 as references, for example, it is possible to generate the reference signals S0 and S1 by calculating a simple brightness value by performing filtering by a predetermined number of taps.

The combination reference signal generation unit 121 supplies the image signal T0 and the image signal T1 to the combination unit 125. Note that, the combination reference signal generation unit 121 supplies the reference signal S0 to the combination coefficient calculation unit 122 and the motion detection unit 123, and supplies the reference signal S1 to the motion detection unit 123.

The combination coefficient calculation unit 122 calculates a combination coefficient for combining the image signal T0 and the image signal T1 with reference to the reference signal S0 from the combination reference signal generation unit 121. The combination coefficient calculation unit 122 supplies the combination coefficient to the combination coefficient modulation unit 124.

The motion detection unit 123 defines a difference between signals, which are obtained by multiplying the reference signal S0 and the reference signal S1 from the combination reference signal generation unit 121 by the exposure ratio SGAIN1, as a motion amount and performs motion determination. At this time, in order to distinguish between the noise of the signal and the blinking of the high-speed blinking object, such as an LED, the motion detection unit 123 compares the motion amount with the amount of noise assumed from the sensor characteristics to calculate the motion coefficient.

At this time, in the motion detection unit 123, it is assumed that determination criteria for motion determination are divided into the case of S0<S1 and the case of S1<S0, for example. Note that, the details of the motion determination in the motion detection unit 123 will be described later with reference to FIGS. 18 and 19. The motion detection unit 123 supplies the motion coefficient to the combination coefficient modulation unit 124.

The combination coefficient modulation unit 124 performs modulation considering the motion coefficient from the motion detection unit 123 with respect to the combination coefficient from the combination coefficient calculation unit 122, thereby calculating a motion-compensated combination coefficient. At this time, in a case where the motion amount is large, the combination coefficient modulation unit 124 performs modulation such that a larger one of the signals obtained by multiplying the image signal T0 and the image signal T1 by the exposure ratio SGAIN1 is combined at a larger proportion. The combination coefficient modulation unit 124 supplies the motion-compensated combination coefficient to the combination unit 125.

The combination unit 125 combines (alpha blends) the image signal T0 and the image signal T1 from the combination reference signal generation unit 121 with the motion-compensated combination coefficient from the combination coefficient modulation unit 124, and outputs a combined image signal as an HDR (High Dynamic Range) combined signal obtained as the result.

The signal processing unit 104 is configured as described above.

(Signal Processing in the Case of Performing Two-Sheet Combination)

Figure 11:
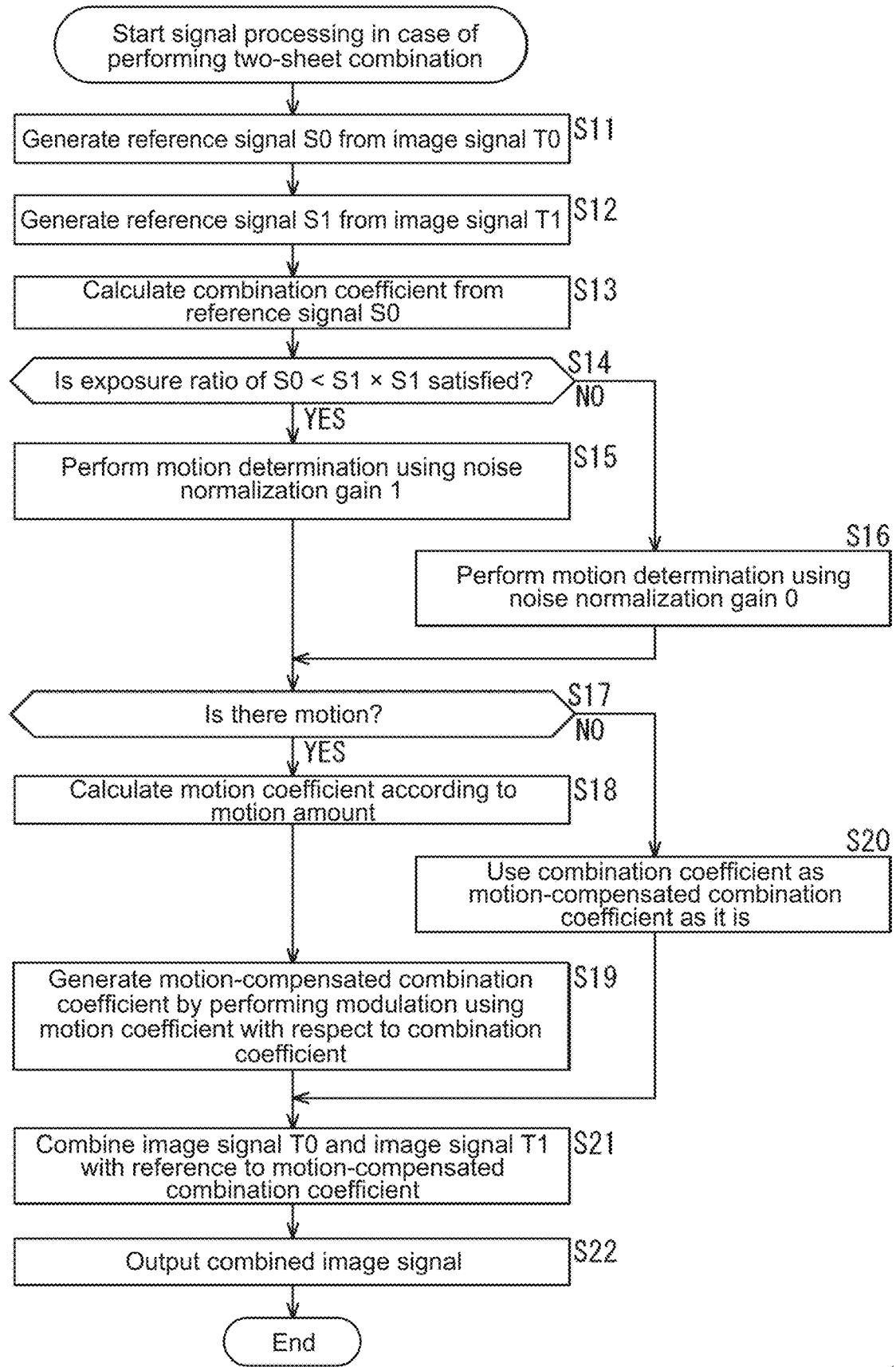
FIG. 11 is a flowchart describing signal processing in the case of performing two-sheet combination.

Next, with reference to the flowchart shown in FIG. 11, the flow of signal processing in the case of performing two-sheet combination, which is executed by the signal processing unit 104 shown in FIG. 10, will be described.

In step S11, the combination reference signal generation unit 121 generates the reference signal S0 from the image signal T0 input thereto.

In step S12, the combination reference signal generation unit 121 generates the reference signal S1 from the image signal T1 input thereto.

Note that, the ratio between the exposure times of T0 and T1 can be, for example, a ratio of T0:T1=16:1. Therefore, it can be said that the image signal T0 is a long-time exposure image (long accumulation image), whereas the image signal T1 is a short-time exposure image (short accumulation image).

In step S13, the combination coefficient calculation unit 122 calculates a combination coefficient from the reference signal S0 obtained in the processing of step S11.

In step S14, the motion detection unit 123 determines whether or not the relationship of the exposure ratio of S0<S1×S1 is satisfied.

In a case where it is determined that the relationship of the exposure ratio of S0<S1×S1 is satisfied in step S14, the process proceeds to step S15. In step S15, the motion detection unit 123 performs motion determination using a noise normalization gain 1.

On the other hand, in step S14, in a case where it is determined that the relationship of the exposure ratio of S0<S1×S1 is not satisfied, that is, the relationship of the exposure ratio of S0≥S1×S1 is satisfied, the process proceeds to step S16. In step S16, the motion detection unit 123 performs motion determination using a noise normalization gain 0.

After the motion determination is performed in the processing of step S15 or S16, the process proceeds to step S17. In step S17, the motion detection unit 123 determines whether or not there is motion on the basis of the result of the motion determination obtained in the processing of step S15 or S16.

In a case where it is determined that there is motion in step S17, the process proceeds to step S18. In step S18, the motion detection unit 123 calculates a motion coefficient according to the motion amount obtained in the processing of step S15 or S16 or the like.

Note that, although the details of the processing of steps S14 to S18 executed by the motion detection unit 123 will be described later with reference to FIG. 19, the accuracy of motion detection can be improved by performing the motion determination processing after performing multiplication of the noise normalization gain (0, 1) according to the sign of the motion evaluation value and the exposure ratio.

In step S19, the combination coefficient modulation unit 124 performs modulation using the motion coefficient obtained in the processing of step S18 with respect to the combination coefficient obtained in the processing of step S18, thereby generating a motion-compensated combination coefficient.

On the other hand, in a case where it is determined that there is no motion in step S17, the process proceeds to step S20. In step S20, the combination coefficient modulation unit 124 uses the combination coefficient obtained in the processing of step S13 as a motion-compensated combination coefficient as it is.

When the motion-compensated combination coefficient is obtained in the processing of step S19 or S20, the process proceeds to step S21.

In step S21, the combination unit 125 combines the image signal T0 and the image signal T1 with reference to the motion-compensated combination coefficient obtained in the processing of step S19 or S20. That is, by using the motion-compensated combination coefficient, the combination unit 125 combines a larger one of the signals, which are obtained by multiplying the image signal T0 and the image signal T1 by the exposure ratio SGAIN1 (=16), at a larger proportion in a case where the motion amount is large.

In step S22, the combination unit 125 outputs the combined image signal obtained in the processing of step S21.

The flow of signal processing in the case of performing two-sheet combination has been described above.

(Example of a Processing Result of a Signal Processing Unit)

Next, the processing result of the signal processing (FIG. 11) by the signal processing unit 104 illustrated in FIG. 7 will be described with reference to FIGS. 12 and 13.

Figure 12:
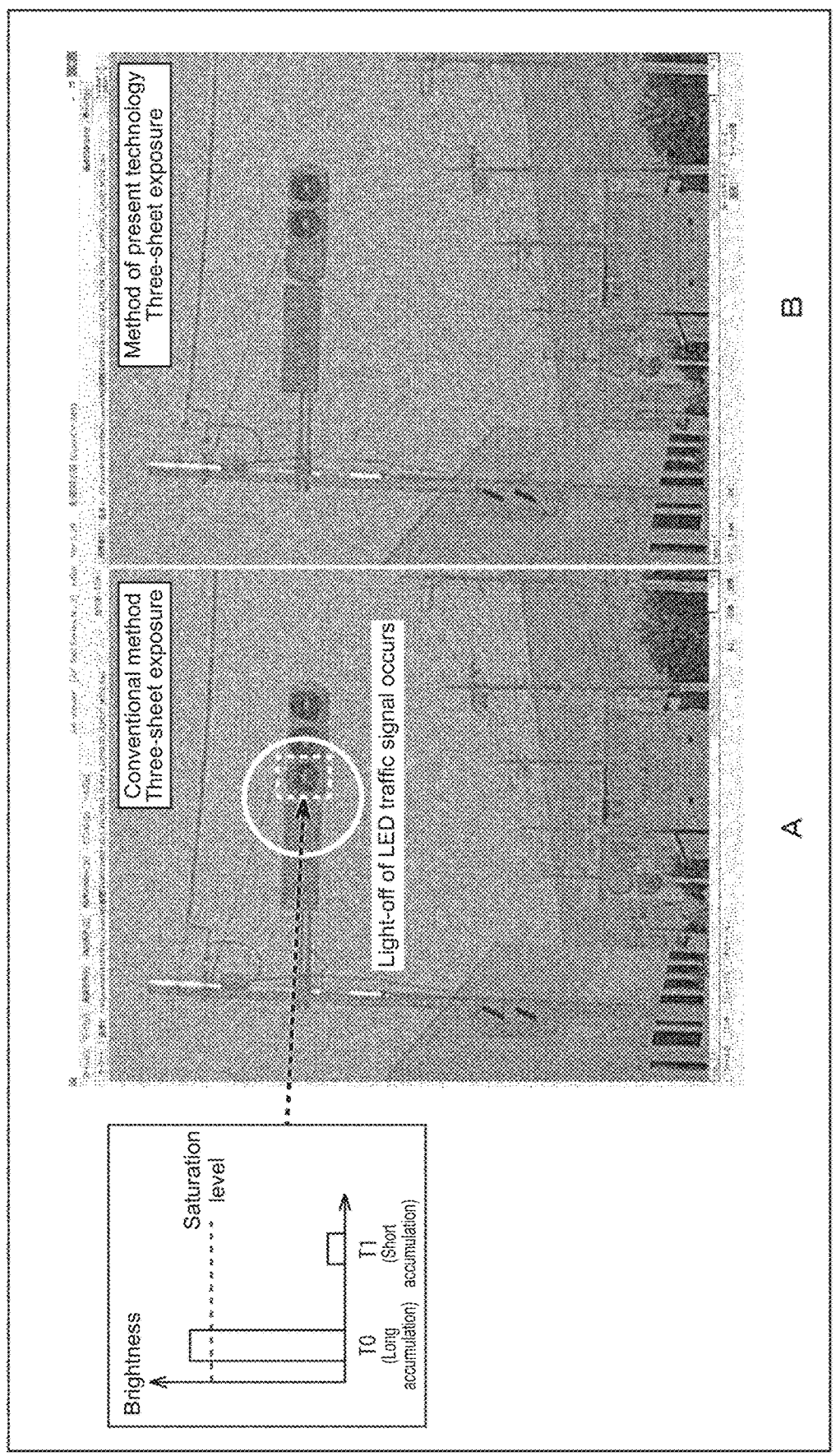
FIG. 12 is a diagram showing an example of a processing result of signal processing of the signal processing unit.

FIG. 12 shows the processing result of signal processing on a captured image in which an LED traffic signal is reflected. Note that, here, a processing result in the case of using a conventional method is shown in A of FIG. 12, and is compared with a processing result in the case of using the method of the present technology in B of FIG. 12.

In the case of the conventional method shown in A of FIG. 12, in a situation in which the light-on state of the LED traffic signal is recorded only in the long accumulation image (image signal T0) and the pixel value of long accumulation (T0) is saturated, when the pixel value exceeding the saturation level of the long accumulation (T0) is replaced with short accumulation (T1) in order to increase the dynamic range of the signal, the LED traffic signal is turned off in the short accumulation image (image signal T1). Accordingly, the signal after the replacement is also turned off.

On the other hand, in the case of the method of the present technology shown in B of FIG. 12, when the pixel value exceeding the saturation level of the long accumulation (T0) is replaced with the short accumulation (T1) in order to increase the dynamic range of the signal, it is determined that blinking of the high-speed blinking object has occurred in a case where there is a large difference in the signal of long accumulation and short accumulation×exposure ratio (S0 and S1×S1 exposure ratio), and a larger value is output. Therefore, the long accumulation image (image signal T0) in which the light-on state of the LED traffic signal is recorded is selected. In the case of the method of the present technology shown in B of FIG. 12, the LED traffic signal is not turned off.

Figure 13:
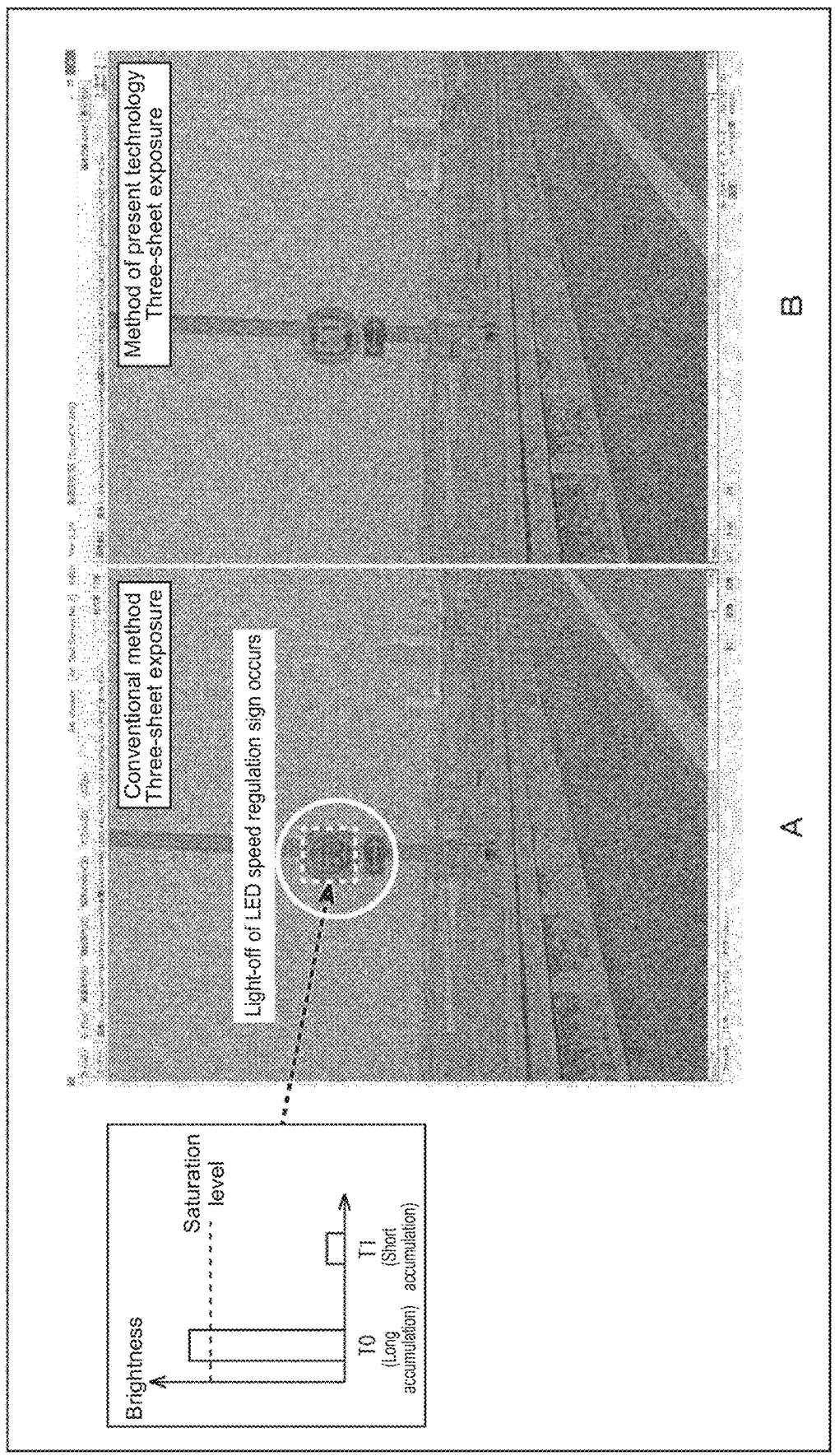
FIG. 13 is a diagram illustrating an example of a processing result of signal processing of the signal processing unit.

FIG. 13 shows the processing result of signal processing on a captured image in which an LED speed regulation sign is reflected. Note that, here, a processing result in the case of using a conventional method is shown in A of FIG. 13, and is compared with a processing result in the case of using the method of the present technology in B of FIG. 13.

In the case of the conventional method shown in A of FIG. 13, in a situation in which the light-on state of the LED speed regulation sign is recorded only in the long accumulation image (image signal T0) and the pixel value of the long accumulation (T0) is saturated, when the pixel value exceeding the saturation level of the long accumulation (T0) is replaced with the short accumulation (T1) in order to increase the dynamic range of the signal, the LED speed regulation sign is turned off in the short accumulation image (image signal T1). Accordingly, the signal after the replacement is also turned off.

On the other hand, in the case of the method of the present technology shown in B of FIG. 13, when the pixel value exceeding the saturation level of the long accumulation (T0) is replaced with the short accumulation (T1) in order to increase the dynamic range of the signal, it is determined that blinking of the high-speed blinking object has occurred in a case where there is a large difference in the signal of long accumulation and short accumulation×exposure ratio (S0 and S1×S1 exposure ratio), and a larger value is output. Therefore, the long accumulation (S0 and S1×S1 exposure ratio) in which the light-on state of the LED speed regulation sign is recorded is selected. In the case of the method of the present technology shown in B of FIG. 13, the LED speed regulation sign is not turned off.

<3. Modification Example of Embodiment of the Present Technology>

(Configuration Example of a Signal Processing Unit in the Case of Performing Three-Sheet Combination)

Figure 14:
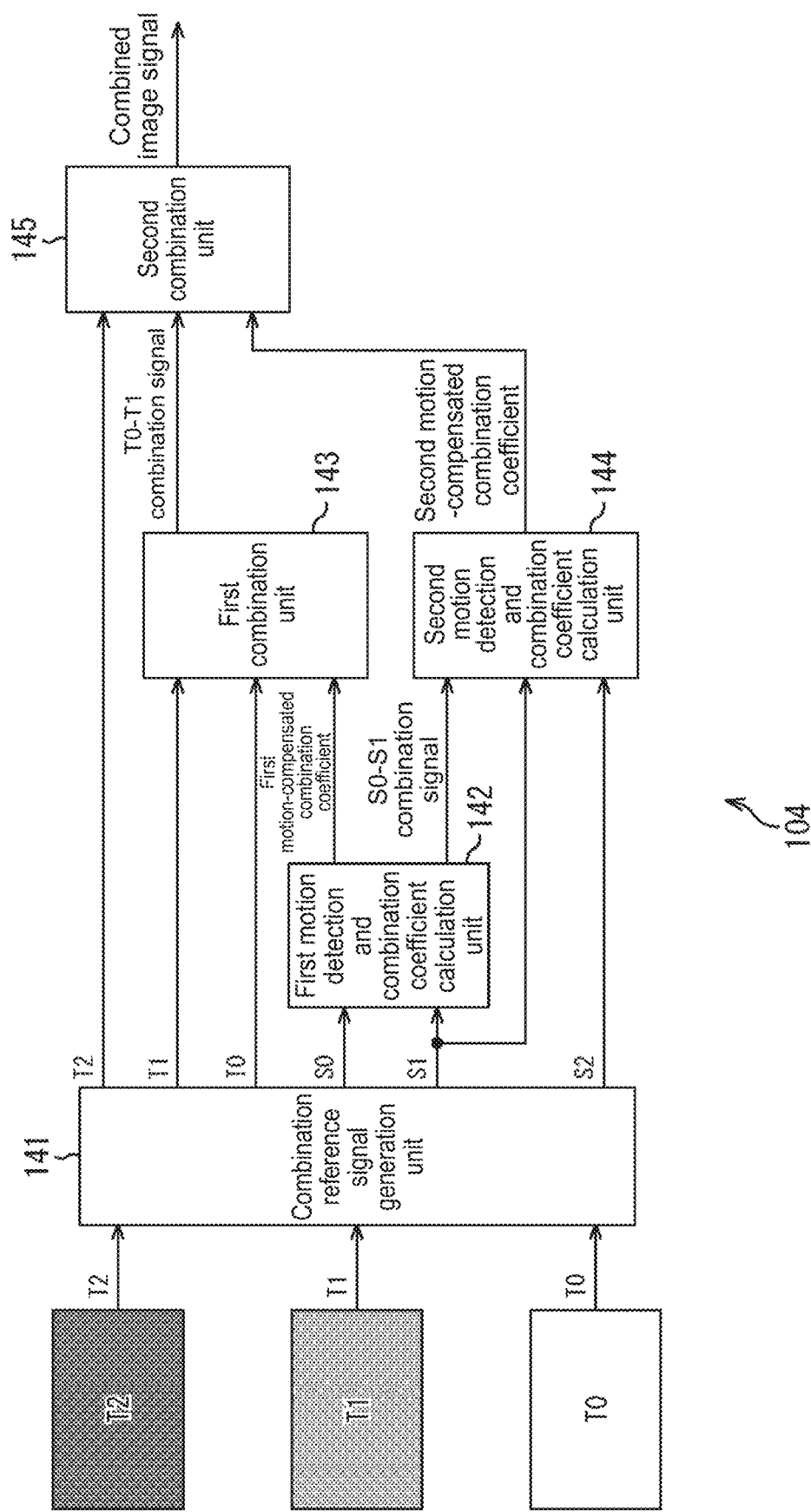
FIG. 14 is a diagram illustrating a configuration example of the signal processing unit in the case of performing three-sheet combination.

FIG. 14 is a diagram illustrating a configuration example of the signal processing unit 104 in the case of performing three-sheet combination.

That is, in the above explanation, as the simplest example, the signal processing when combining two captured images into one output image has been described. In FIG. 14, however, signal processing when combining three captured images into one output image will be described.

Note that, in FIG. 14, T0, T1, and T2 indicate captured images corresponding to the respective exposure times when performing imaging three times within one frame. Note that, in FIG. 14, the ratio of the exposure times in respective exposures is assumed to be, for example, a ratio of T0:T1:T2=4:2:1 in order to secure the dynamic range of the signal. The exposure ratio gain for adjusting the brightness of T1 to T0 is defined as SGAIN1, and the exposure ratio gain for adjusting the brightness of T2 to T0 is defined as SGAIN2. In the above example, SGAIN1=2 and SGAIN2=4. Hereinafter, captured images corresponding to T0, T1, and T2 will also be described as an image signal T0, an image signal T1, and an image signal T2, respectively.

In FIG. 14, the signal processing unit 104 is configured to include a combination reference signal generation unit 141, a first motion detection and combination coefficient calculation unit 142, a first combination unit 143, a second motion detection and combination coefficient calculation unit 144, and a second combination unit 145.

The combination reference signal generation unit 141 generates a signal (a reference signal S0, a reference signal S1, and a reference signal S2) serving as a reference for combining the image signal T0, the image signal T1, and the image signal T2. At this time, the combination reference signal generation unit 141 generates the reference signal S0 from the image signal T0, the reference signal S1 from the image signal T1, and the reference signal S2 from the image signal T2. Note that, as a method of generating the reference signals S0, S1, and S2 as references, for example, it is possible to generate the reference signals S0, S1, and S2 by calculating a simple brightness value by performing filtering by a predetermined number of taps.

The combination reference signal generation unit 141 supplies the image signal T0 and the image signal T1 to the first combination unit 143, and supplies the image signal T2 to the second combination unit 145. Note that, the combination reference signal generation unit 141 supplies the reference signal S0 and the reference signal S1 to first motion detection and combination coefficient calculation unit 142, and supplies the reference signal S1 and the reference signal S2 to the second motion detection and combination coefficient calculation unit 144.

The first motion detection and combination coefficient calculation unit 142 calculates a first combination coefficient for combining the image signal T0 and the image signal T1 with reference to the reference signal S0 from the combination reference signal generation unit 141. Note that, the first motion detection and combination coefficient calculation unit 142 defines a difference between signals, which are obtained by multiplying the reference signals S0 and S1 from the combination reference signal generation unit 141 by the exposure ratio SGAIN1, as a first motion amount and performs motion determination.

At this time, in order to distinguish between the noise of the signal and the blinking of the high-speed blinking object, such as an LED, the first motion detection and combination coefficient calculation unit 142 compares the first motion amount with the amount of noise assumed from the sensor characteristics to calculate the first motion coefficient. Here, when performing motion determination, it is assumed that determination criteria for motion determination are divided into the case of S0<S1 and the case of S1<S0, for example. Note that, the details of the motion determination in the first motion detection and combination coefficient calculation unit 142 will be described later with reference to FIGS. 18 and 19.

The first motion detection and combination coefficient calculation unit 142 performs modulation considering the first motion coefficient with respect to the first combination coefficient, thereby calculating a first motion-compensated combination coefficient. At this time, in a case where the motion amount is large, the first motion detection and combination coefficient calculation unit 142 performs modulation such that a larger one of the signals obtained by multiplying the image signal T0 and the image signal T1 by the exposure ratio SGAIN1 is combined at a larger proportion. The first motion detection and combination coefficient calculation unit 142 supplies the first motion-compensated combination coefficient to the first combination unit 143.

Note that, the first motion detection and combination coefficient calculation unit 142 combines (alpha blends) the reference signal S0 and the reference signal S1 with reference to the first motion-compensated combination coefficient, and supplies an S0-S1 combination signal obtained as the result to the second motion detection and combination coefficient calculation unit 144.

The first combination unit 143 combines (alpha blends) the image signal T0 and the image signal T1 from the combination reference signal generation unit 141 with the first motion-compensated combination coefficient from the first motion detection and combination coefficient calculation unit 142, and supplies a T0-T1 combination signal obtained as the result to the second combination unit 145.

The second motion detection and combination coefficient calculation unit 144 calculates a second combination coefficient for combining the T0-T1 combination signal and the image signal T2 with reference to the reference signal S1 from the combination reference signal generation unit 141. Note that, the second motion detection and combination coefficient calculation unit 144 defines a difference between signals, which are obtained by multiplying the S0-S1 combination signal and S2 by the exposure ratio SGAIN1, as a second motion amount and performs motion determination.

At this time, in order to distinguish between the noise of the signal and the blinking of the high-speed blinking object, such as an LED, the second motion detection and combination coefficient calculation unit 144 compares the second motion amount with the amount of noise assumed from the sensor characteristics to calculate the second motion coefficient. Here, when performing motion determination, it is assumed that determination criteria for motion determination are divided into the case of S0-S1 combination signal<S2 and the case of S2<S0-S1 combination signal, for example. Note that, the details of the motion determination in the second motion detection and combination coefficient calculation unit 144 will be described later with reference to FIGS. 18 and 19.

The second motion detection and combination coefficient calculation unit 144 performs modulation considering the second motion coefficient with respect to the second combination coefficient, thereby calculating a second motion-compensated combination coefficient. At this time, in a case where the motion amount is large, the second motion detection and combination coefficient calculation unit 144 performs modulation such that a larger one of the signals obtained by multiplying the T0-T1 combination signal and the image signal T2 by the exposure ratio SGAIN2 is combined at a larger proportion. The second motion detection and combination coefficient calculation unit 144 supplies the second motion-compensated combination coefficient to the second combination unit 145.

The second combination unit 145 combines (alpha blends) the T0-T1 combination signal from the first combination unit 143 and the image signal T2 from the combination reference signal generation unit 141 with the second motion-compensated combination coefficient from the second motion detection and combination coefficient calculation unit 144, and outputs a combined image signal as an HDR combined signal obtained as the result.

The signal processing unit 104 shown in FIG. 14 is configured as described above. In the signal processing unit 104 shown in FIG. 14, the combination is separated into two stages. Therefore, when performing combination in the second stage for blending the T2 signal with a high possibility that the light-on state of the light source is not recorded since the exposure time is short compared with combination in the first stage for blending between T0 and T1 signals, adjustment such as lowering the intensity to which this correction is to be applied becomes possible. As a result, the effect of suppressing the adverse effects can be expected.

(Signal Processing in the Case of Performing Three-Sheet Combination)

Next, with reference to the flowcharts illustrated in FIGS. 15 and 16, the flow of signal processing in the case of performing three-sheet combination, which is executed by the signal processing unit 104 shown in FIG. 14, will be described.

In step S51, the combination reference signal generation unit 141 generates the reference signal S0 from the image signal T0 input thereto.

In step S52, the combination reference signal generation unit 141 generates the reference signal S1 from the image signal T1 input thereto.

In step S53, the combination reference signal generation unit 141 generates the reference signal S2 from the image signal T1 input thereto.

Note that, the ratio between the exposure times of T0, T1, and T2 can be, for example, a ratio of T0:T1:T2=4:2:1. Therefore, it can be said that the image signal T0 is a long-time exposure image (long accumulation image), the image signal T1 is a medium-time exposure image (medium accumulation image), and the image signal T2 is a short-time exposure image (short accumulation image).

In step S54, the first motion detection and combination coefficient calculation unit 142 calculates a first combination coefficient from the reference signal S0 obtained in the processing of step S51.

In step S55, the first motion detection and combination coefficient calculation unit 142 determines whether or not the relationship of the exposure ratio of S0<S1×S1 is satisfied.

In a case where it is determined that the relationship of the exposure ratio of S0<S1×S1 is satisfied in step S55, the process proceeds to step S56. In step S56, the first motion detection and combination coefficient calculation unit 142 performs motion determination using a noise normalization gain 1.

On the other hand, in step S55, in a case where it is determined that the relationship of the exposure ratio of S0<S1×S1 is not satisfied, that is, the relationship of the exposure ratio of S0≥S1×S1 is satisfied, the process proceeds to step S57. In step S57, the first motion detection and combination coefficient calculation unit 142 performs motion determination using a noise normalization gain 0.

After the motion determination is performed in the processing of step S56 or S57, the process proceeds to step S58. In step S58, the first motion detection and combination coefficient calculation unit 142 determines whether or not there is motion on the basis of the result of the motion determination obtained in the processing of step S56 or S57.

In a case where it is determined that there is motion in step S58, the process proceeds to step S59. In step S59, the first motion detection and combination coefficient calculation unit 142 calculates a first motion coefficient according to the motion amount obtained in the processing of step S56 or S57 or the like.

Note that, although the details of the processing of steps S55 to S59 executed by the first motion detection and combination coefficient calculation unit 142 will be described later with reference to FIG. 19, the accuracy of motion detection can be improved by performing the motion determination processing after performing multiplication of the noise normalization gain (0, 1) according to the sign of the motion evaluation value and the exposure ratio.

In step S60, the first motion detection and combination coefficient calculation unit 142 performs modulation using the first motion coefficient obtained in the processing of step S59 with respect to the first combination coefficient obtained in the processing of step S54, thereby generating a first motion-compensated combination coefficient.

On the other hand, in a case where it is determined that there is no motion in step S58, the process proceeds to step S61. In step S61, the first motion detection and combination coefficient calculation unit 142 uses the first combination coefficient obtained in the processing of step S54 as a first motion-compensated combination coefficient as it is.

When the first motion-compensated combination coefficient is obtained in the processing of step S60 or S61, the process proceeds to step S62.

In step S62, the first motion detection and combination coefficient calculation unit 142 combines the reference signal S0 and the reference signal S1 with reference to the first motion-compensated combination coefficient obtained in the processing of step S60 or S61 to generate an S0-S1 combination signal.

In step S63, the first combination unit 143 combines the image signal T0 and the image signal T1 with reference to the first motion-compensated combination coefficient obtained in the processing of step S60 or S61 to generate a T0-T1 combination signal.

In step S64, the second motion detection and combination coefficient calculation unit 144 calculates a second combination coefficient from the reference signal S1 obtained in the processing of step S52.

In step S65, the second motion detection and combination coefficient calculation unit 144 determines whether or not the relationship of the exposure ratio of S0-S1 combination signal<S2×S2 is satisfied.

In a case where it is determined that the relationship of the exposure ratio of S0-S1 combination signal<S2×S2 is satisfied in step S65, the process proceeds to step S66. In step S66, the second motion detection and combination coefficient calculation unit 144 performs motion determination using a noise normalization gain 2.

On the other hand, in step S65, in a case where it is determined that the relationship of the exposure ratio of S0-S1 combination signal<S2×S2 is not satisfied, that is, the relationship of the exposure ratio of S0-S1 combination signal≥S2×S2 is satisfied, the process proceeds to step S67. In step S67, the second motion detection and combination coefficient calculation unit 144 performs motion determination using a noise normalization gain 1.

After the motion determination is performed in the processing of step S66 or S67, the process proceeds to step S68. In step S68, the second motion detection and combination coefficient calculation unit 144 determines whether or not there is motion on the basis of the result of the motion determination obtained in the processing of step S66 or S67.

In a case where it is determined that there is motion in step S68, the process proceeds to step S69. In step S69, the second motion detection and combination coefficient calculation unit 144 calculates a second motion coefficient according to the motion amount obtained in the processing of step S66 or S67 or the like.

Note that, although the details of the processing of steps S65 to S69 executed by the second motion detection and combination coefficient calculation unit 144 will be described later with reference to FIG. 19, the accuracy of motion detection can be improved by performing the motion determination processing after performing multiplication of the noise normalization gain (1, 2) according to the sign of the motion evaluation value and the exposure ratio.

In step S70, the second motion detection and combination coefficient calculation unit 144 performs modulation using the second motion coefficient obtained in the processing of step S69 with respect to the second combination coefficient obtained in the processing of step S64, thereby generating a second motion-compensated combination coefficient.

On the other hand, in a case where it is determined that there is no motion in step S68, the process proceeds to step S71. In step S71, the second motion detection and combination coefficient calculation unit 144 uses the second combination coefficient obtained in the processing of step S64 as a second motion-compensated combination coefficient as it is.

When the second motion-compensated combination coefficient is obtained in the processing of step S70 or S71, the process proceeds to step S72.

In step S72, the second combination unit 145 combines the T0-T1 combination signal and the image signal T2 with reference to the second motion-compensated combination coefficient obtained in the processing of step S70 or S71.

In step S73, the second combination unit 145 outputs the combined image signal obtained in the processing of step S72.

The flow of signal processing in the case of performing three-sheet combination has been described above.

(Another Configuration Example of a Signal Processing Unit in the Case of Performing Three-Sheet Combination)

Figure 17:
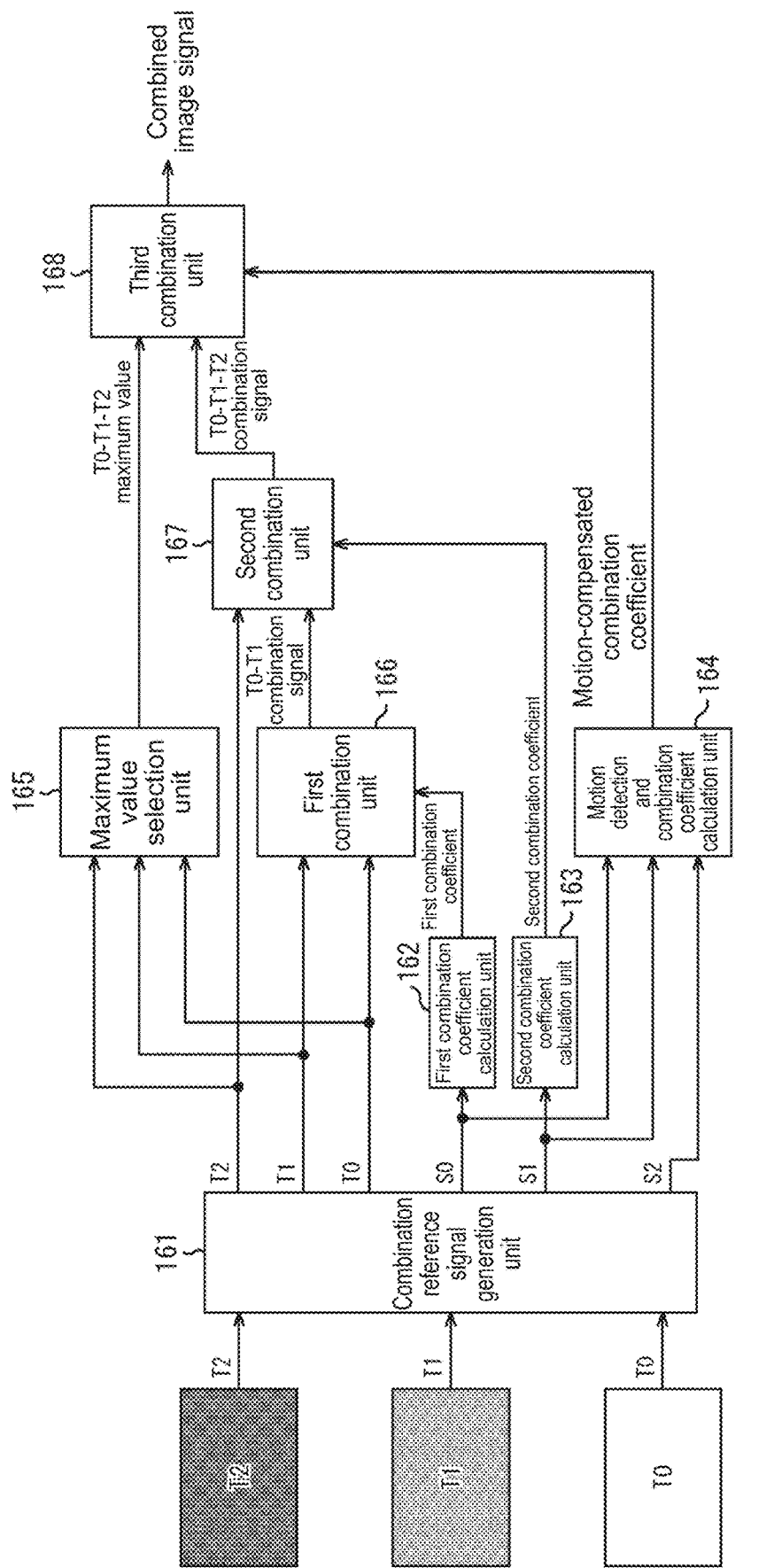
FIG. 17 is a diagram illustrating another configuration example of the signal processing unit in the case of performing three-sheet combination.

FIG. 17 is a diagram illustrating another configuration example of the signal processing unit 104 in the case of performing three-sheet combination.

In FIG. 17, signal processing when combining three captured images into one output image will be described.

Here, the signal processing unit 104 shown in FIG. 14 described above is configured such that, when combining three captured images into one sheet, combination is performed twice and motion detection is performed each time.

On the other hand, the signal processing unit 104 shown in FIG. 17 is the same as in FIG. 14 in that combination is performed twice, but generates a T0-T1-T2 combination signal first without performing motion detection at the time of combination. Then, the signal processing unit 104 shown in FIG. 17 is characterized in that the maximum value of T0-T1-T2 is combined in the final stage with respect to the T0-T1-T2 combination signal, in which motion information is not considered, by adding, in parallel with the processing, processing for selecting the maximum value of three captured images and processing for performing motion detection in the three captured images.

In FIG. 17, the signal processing unit 104 is configured to include a combination reference signal generation unit 161, a first combination coefficient calculation unit 162, a second combination coefficient calculation unit 163, a motion detection and combination coefficient calculation unit 164, a maximum value selection unit 165, a first combination unit 166, a second combination unit 167, and a third combination unit 168.

The combination reference signal generation unit 161 generates a signal (a reference signal S0, a reference signal S1, and a reference signal S2) serving as a reference for combining the image signal T0, the image signal T1, and the image signal T2. At this time, the combination reference signal generation unit 161 generates the reference signal S0 from the image signal T0, the reference signal S1 from the image signal T1, and the reference signal S2 from the image signal T2.

The combination reference signal generation unit 161 supplies the image signal T0 and the image signal T1 to the first combination unit 166, and supplies the image signal T2 to the second combination unit 167. Note that, the combination reference signal generation unit 161 supplies the image signal T0 to the image signal T2 to the maximum value selection unit 165.

Note that, the combination reference signal generation unit 161 supplies the reference signal S0 to the first combination coefficient calculation unit 162, and supplies the reference signal S1 to the second combination coefficient calculation unit 163. Note that, the combination reference signal generation unit 161 supplies the reference signal S0 to the reference signal S2 to the motion detection and combination coefficient calculation unit 164.

The first combination coefficient calculation unit 162 calculates a first combination coefficient for combining the image signal T0 and the image signal T1 with reference to the reference signal S0 from the combination reference signal generation unit 161, and supplies the first combination coefficient to the first combination unit 166.

The second combination coefficient calculation unit 163 calculates a second combination coefficient for combining the T0-T1 combination signal and the image signal T2 with reference to the reference signal S1 from the combination reference signal generation unit 161, and supplies the second combination coefficient to the second combination unit 167.

The motion detection and combination coefficient calculation unit 164 performs motion determination on the basis of the reference signal S0 to the reference signal S2 from the combination reference signal generation unit 161, calculates a motion-compensated combination coefficient according to the result of the motion determination, and supplies the motion-compensated combination coefficient to the third combination unit 168.

The first combination unit 166 combines (alpha blends) the image signal T0 and the image signal T1 from the combination reference signal generation unit 161 with the first combination coefficient from the first combination coefficient calculation unit 162, and supplies a T0-T1 combination signal obtained as the result to the second combination unit 167.

The second combination unit 167 combines (alpha blends) the T0-T1 combination signal from the first combination unit 166 and the image signal T2 from the combination reference signal generation unit 161 with the second combination coefficient from the second combination coefficient calculation unit 163, and supplies a T0-T1-T2 combination signal obtained as the result to the third combination unit 168.

The maximum value selection unit 165 selects the maximum value of the three captured images on the basis of the image signal T0 to the image signal T2 from the combination reference signal generation unit 161, and supplies a T0-T1-T2 maximum value obtained as the result to the third combination unit 168.

For the T0-T1-T2 combination signal from the second combination unit 167, the third combination unit 168 combines (alpha blends) the T0-T1-T2 maximum value from the maximum value selection unit 165 with the motion-compensated combination coefficient from the motion detection and combination coefficient calculation unit 164, and outputs a combined image signal as an HDR combined signal obtained as the result.

The signal processing unit 104 shown in FIG. 17 is configured as described above.

(Modification Example of Motion Detection Processing)

Figure 18:
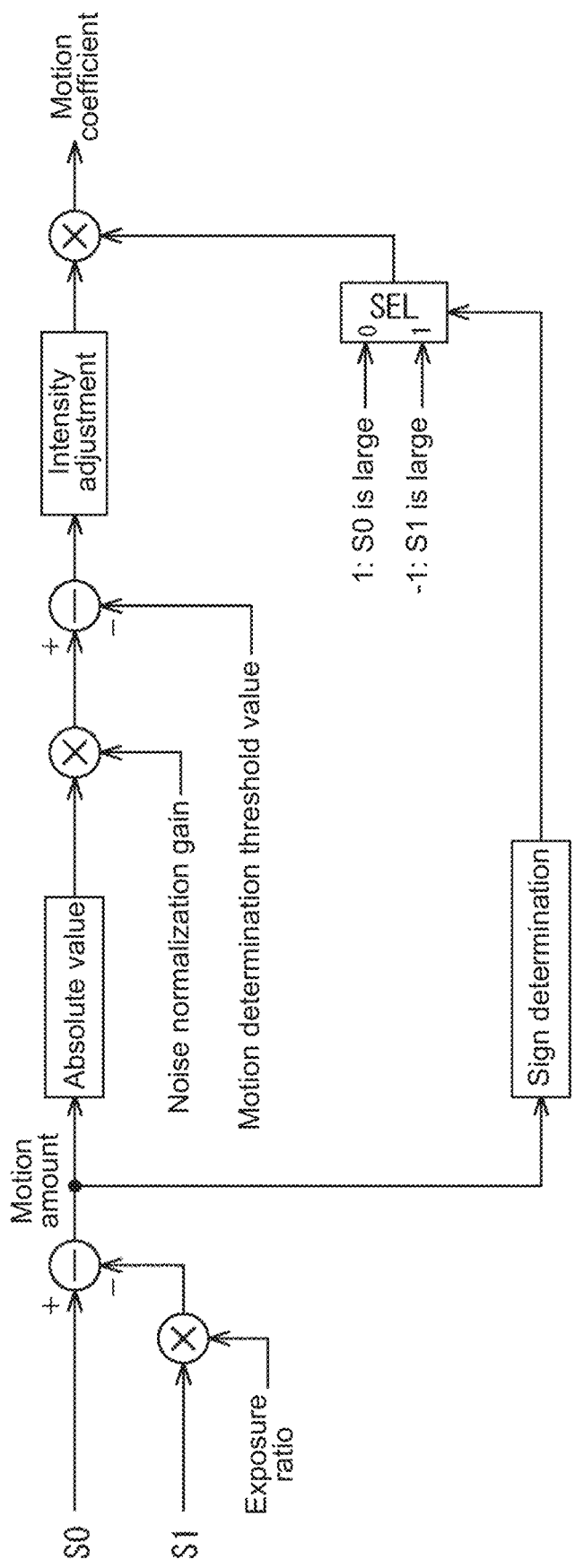
FIG. 18 is a diagram illustrating a modification example of motion detection processing of a motion detection unit.

FIG. 18 is a diagram illustrating a modification example of the motion detection processing by the motion detection unit 123 in FIG. 10, the first motion detection and combination coefficient calculation unit 142 in FIG. 14, and the like.

In order to capture the light-on state of the high-speed blinking object by applying the present technology, it is essential to perform motion detection accurately. Here, an example of a method for this is presented.

For example, in the motion detection processing shown in FIG. 18, when the difference signal between the long accumulation (S0) and medium accumulation (S1)×exposure ratio gain (long accumulation exposure time (T0)÷medium accumulation exposure light time (T1)) is equal to or higher than the noise level, it is determined that there is motion or light-off of the high-speed blinking subject according to the motion determination threshold value, and a motion coefficient for performing correction is calculated.

At this time, by multiplying the difference signal by a normalization gain, an evaluation value indicating how many times the difference signal is multiplied by noise is generated. Here, the noise normalization gain is calculated by considering a gain (for example, an AGC (Automatic Gain Control), a calibration gain, a level balance gain, or an exposure ratio gain), which is to be applied to the input signal, for each color.

For example, in a case where the noise normalization gain is not appropriately set and the motion amount becomes excessive with respect to the correct value, noise of the image is erroneously determined to be a motion. Accordingly, noise is output to degrade the image quality. Note that, for example, in a case where the noise normalization gain is not appropriately set and the motion amount becomes too small with respect to the correct value, blinking of the LED is erroneously determined to be noise. Accordingly, it is not possible to correctly output the light-on state. Therefore, in the motion detection processing shown in FIG. 18, an appropriately noise normalization gain is set.

(Another Modification Example of Motion Detection Processing)

Figure 19:
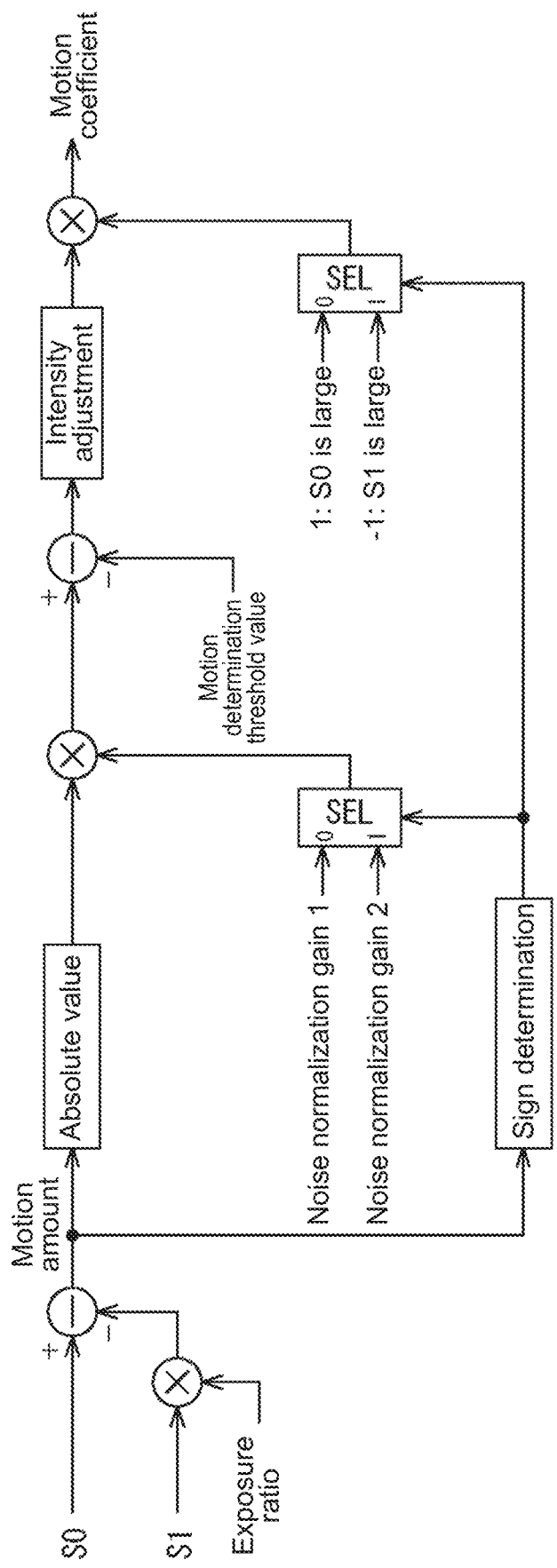
FIG. 19 is a diagram illustrating another modification example of the motion detection processing of the motion detection unit.

FIG. 19 is a diagram illustrating another modification example of the motion detection processing by the motion detection unit 123 in FIG. 10, the first motion detection and combination coefficient calculation unit 142 in FIG. 14, or the like.

In the motion detection processing, in order to improve the accuracy of motion detection, a method of performing motion determination after performing multiplication of the motion determination gain (noise normalization gain) according to the sign of the motion evaluation value and the exposure ratio can be considered.

Here, for example, in the motion detection processing shown in FIG. 19, for example, 1.0 can be set as the noise normalization gain 1 and, for example, the reciprocal of the exposure ratio can be set as the noise normalization gain 2. In the motion detection processing shown in FIG. 19, by setting such a noise normalization gain according to sign determination of the motion amount, it is possible to share the motion determination threshold value regardless of the sign of the motion amount. Therefore, it is possible to suppress the adverse effects of the maximum value output, such as noise missing.

Note that, in FIGS. 18 and 19, the motion detection processing by the motion detection unit 123 in FIG. 10 or the first motion detection and combination coefficient calculation unit 142 in FIG. 14 has been described. However, the motion detection processing described herein may be applied to the motion detection processing performed by the second motion detection and combination coefficient calculation unit 144 in FIG. 14 or the motion detection and combination coefficient calculation unit 164 in FIG. 17.

For example, in the signal processing in the case of performing three-sheet combination described with reference to the flowcharts of FIGS. 15 and 16 described above, motion determination of two stages is performed in the processing of step S58 in FIG. 15 and the processing of step S68 in FIG. 16. However, in the case of performing the three-sheet combination, three normalization gains of noise normalization gains 0, 1, and 2 are used.

Figure 15:
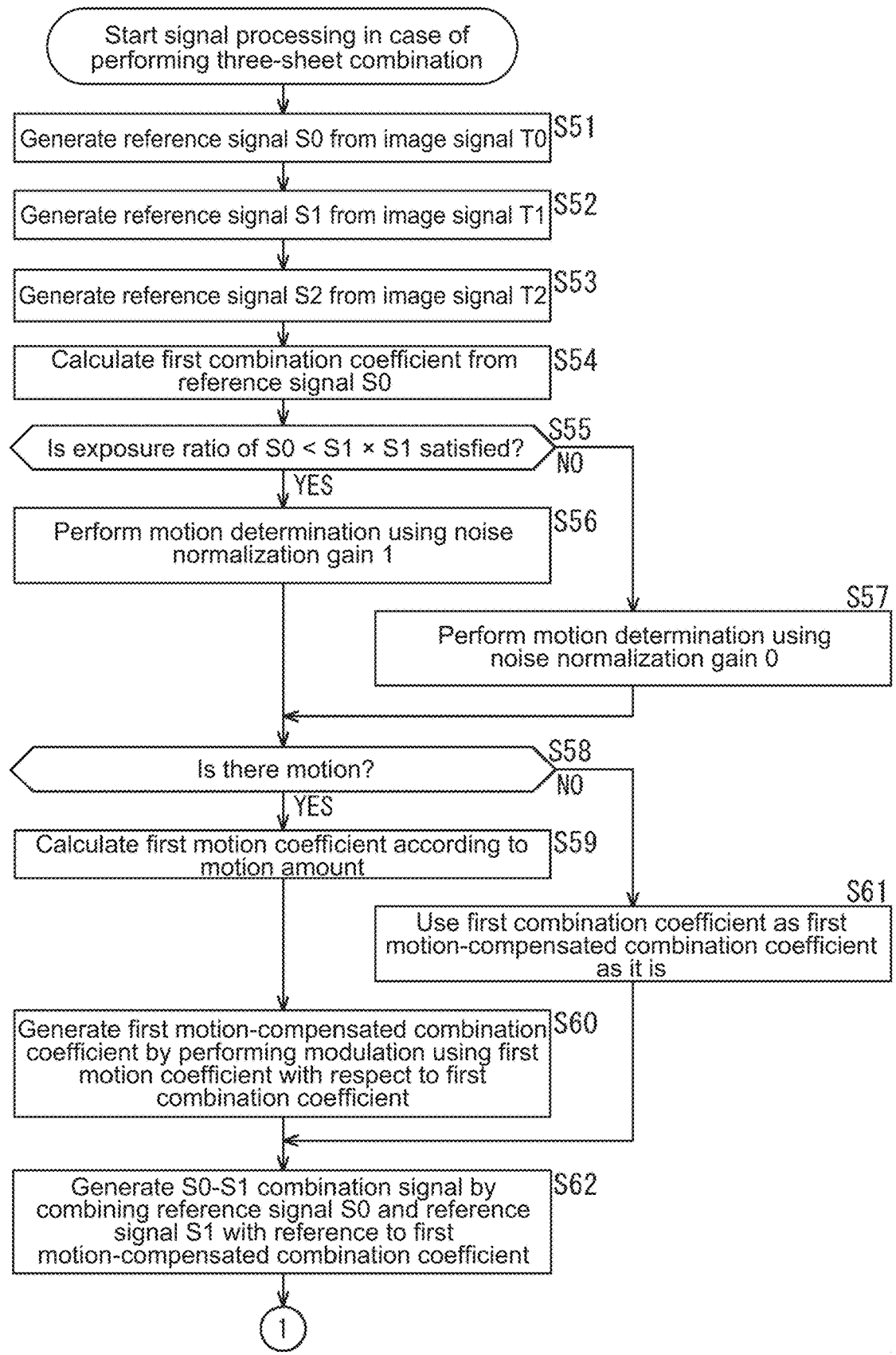
FIG. 15 is a flowchart describing signal processing in the case of performing three-sheet combination.

That is, in the first motion detection and combination coefficient calculation unit 142, in a case where it is determined that the relationship of S0≥S1×S1 exposure ratio is satisfied in the determination processing of step S55, the noise normalization gain 0 is selected and motion determination is performed (S57 in FIG. 15). On the other hand, in a case where it is determined that the relationship of S0<S1× S1 exposure ratio is satisfied in the determination processing of step S55, the noise normalization gain 1 is selected and motion determination is performed (S56 in FIG. 15).

Figure 16:
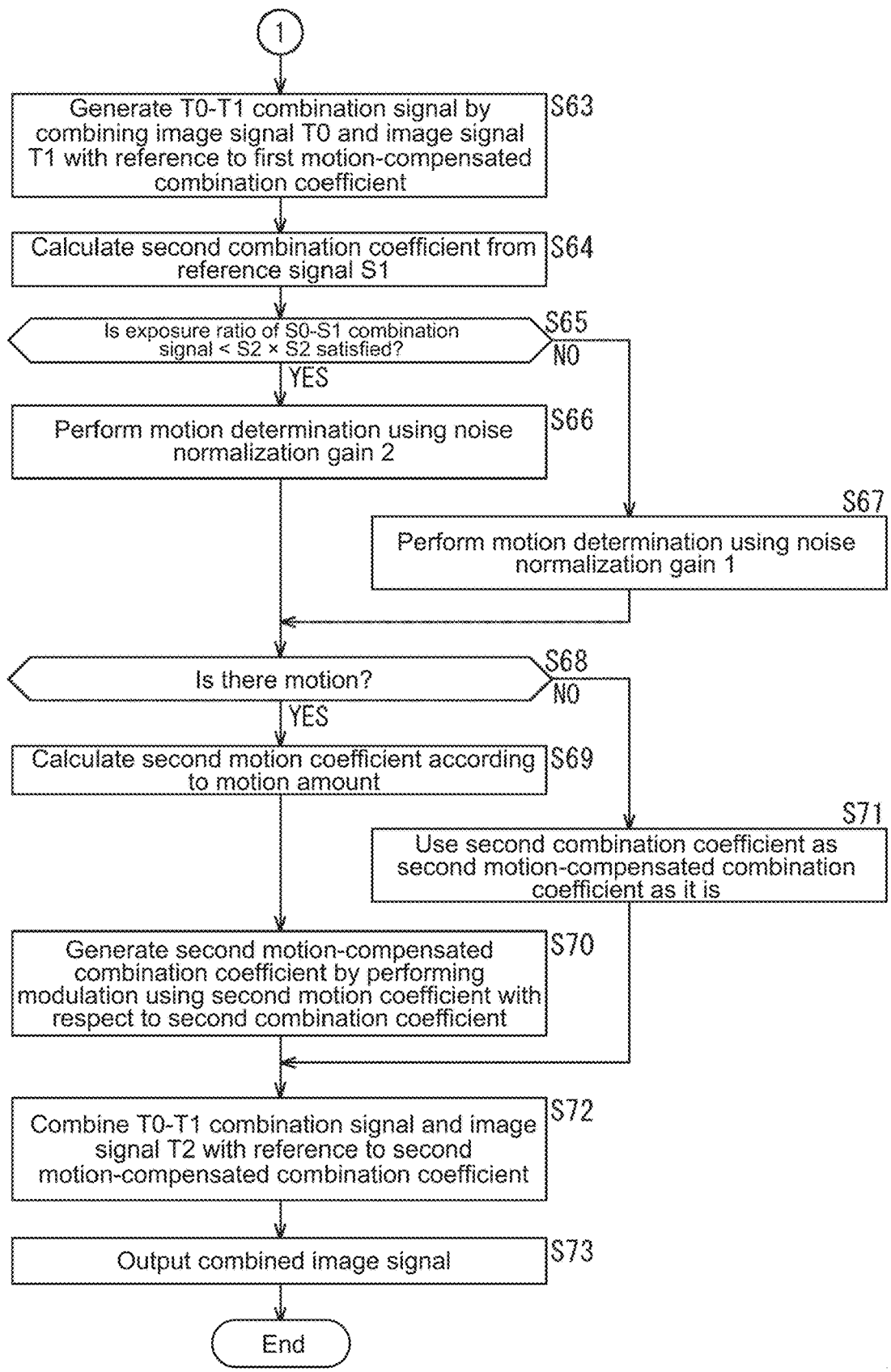
FIG. 16 is a flowchart describing signal processing in the case of performing three-sheet combination.

Note that, in the second motion detection and combination coefficient calculation unit 144, in a case where it is determined that the relationship of S0-S1 combination signal≥S2×S2 exposure ratio is satisfied in the determination processing of step S65, the noise normalization gain 1 is selected and motion determination is performed (S67 in FIG. 16). On the other hand, in a case where it is determined that the relationship of S0-S1 combination signal<S2×S2 exposure ratio is satisfied in the determination processing of step S65, the noise normalization gain 2 is selected and motion determination is performed (S66 in FIG. 16).

Here, the noise normalization gain 1 (S56 in FIG. 15) selected by the first motion detection and combination coefficient calculation unit 142 and the noise normalization gain 1 (S67 in FIG. 16) selected by the second motion detection and combination coefficient calculation unit 144 are the same value. Accordingly, in this motion determination of two stages, three noise normalization gains are used. Then, by performing the motion determination processing after performing multiplication of the noise normalization gain according to the sign of the motion evaluation value and the exposure ratio, it is possible to improve the accuracy of motion detection.

<4. Detailed Contents of Signal Processing of the Present Technology>

Next, detailed contents of the signal processing performed by the signal processing unit 104 will be described with reference to FIGS. 20 to 23.

Figure 20:
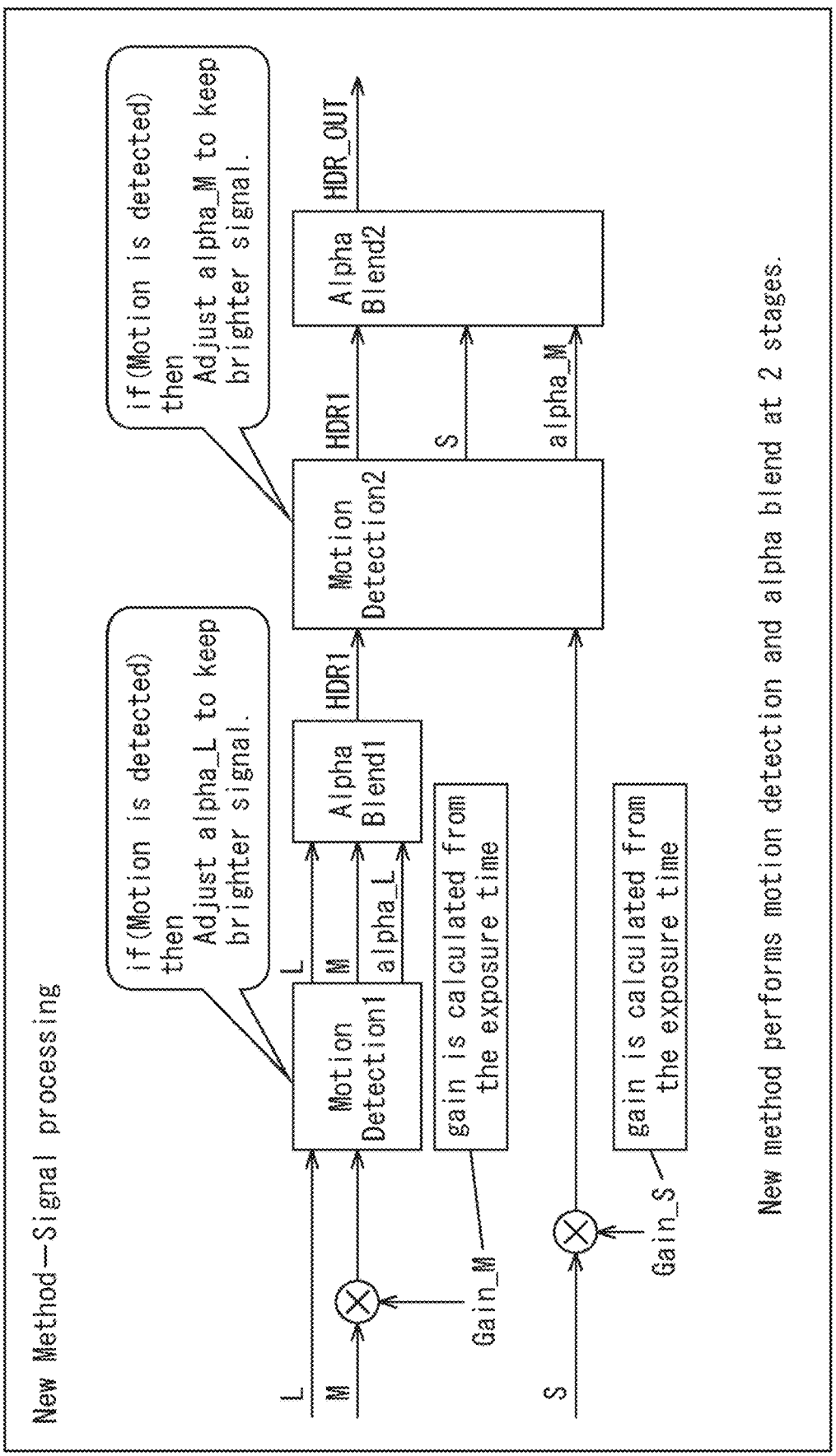
FIG. 20 is a diagram describing the detailed contents of signal processing of the present technology.

FIG. 20 illustrates signal processing when combining three captured images (L, M, and S) into one output image.

Figure 21:
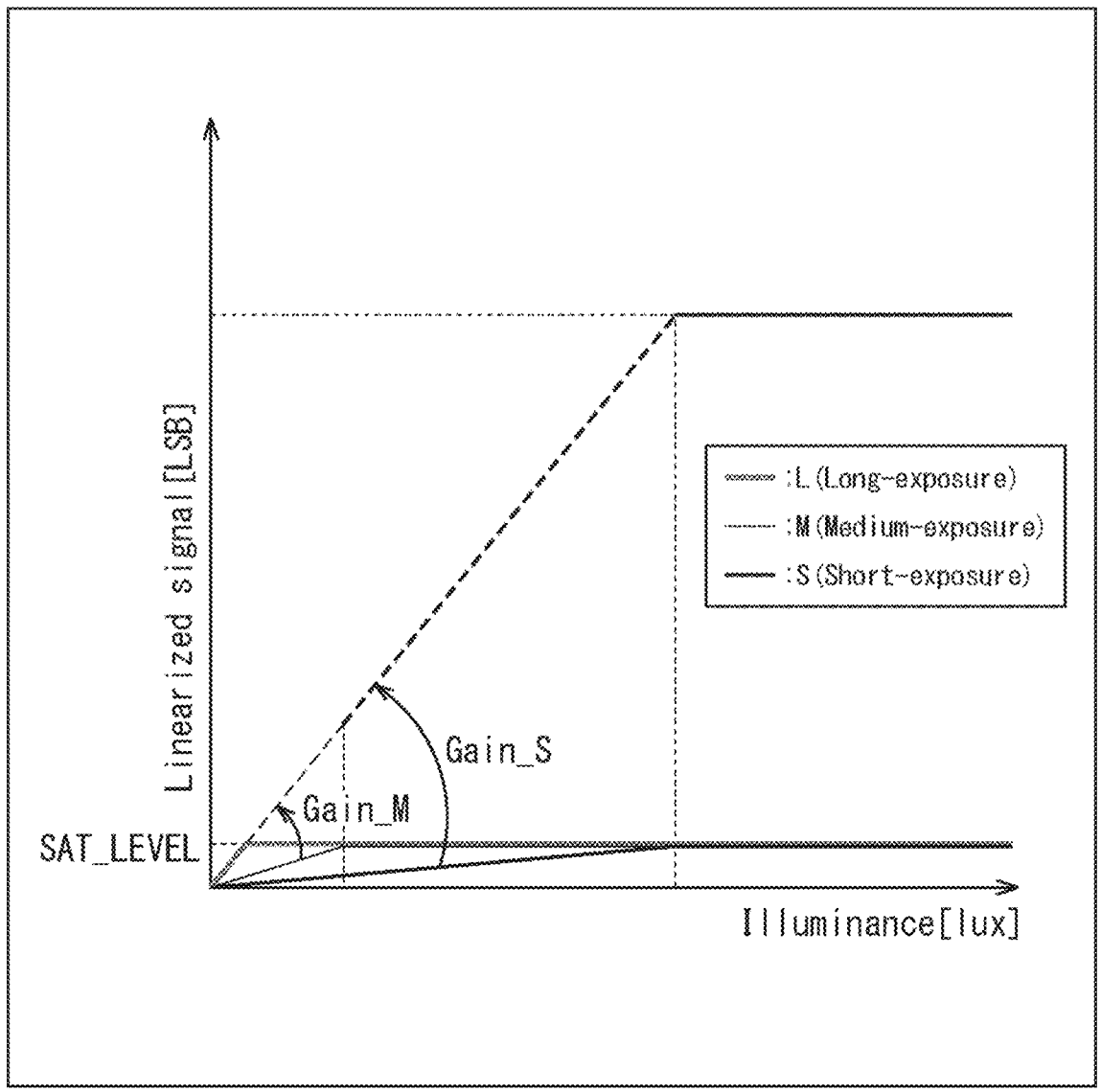
FIG. 21 is a diagram describing the detailed contents of signal processing of the present technology.

In the signal processing illustrated in FIG. 20, motion detection processing and combination processing (alpha blending) are performed in two stages. Note that, assuming that the vertical axis indicates Linearized signal [LSB] and the horizontal axis indicates Illuminance [lux], FIG. 21 illustrates the relationship between these and three kinds of exposures (L: Long Exposure, M: Medium Exposure, S: Short Exposure).

Note that, in FIG. 20, as signal processing in the case of performing three-sheet combination, three captured images (L, M, S) are input. Among L, M, and S, long accumulation (L: Long Exposure) corresponds to T0, medium accumulation (M: Medium Exposure) corresponds to T1, and short accumulation (S: Short Exposure) corresponds to T2. That is, the long accumulation image (L) is a long-time exposure image, and corresponds to the image of the image signal T0 described above. Note that, the medium accumulation image (M) corresponds to the image of the image signal T1 that is a medium-time exposure image, and the short accumulation image (S) corresponds to the image of the image signal T2 that is a short-time exposure image.

Note that, in FIG. 20, "Motion Detection1", "Alpha Blend1", "Motion Detection2", and "Alpha Blend2" correspond to, for example, the first motion detection and combination coefficient calculation unit 142, the first combination unit 143, the second motion detection and combination coefficient calculation unit 144, and the second combination unit 145 that are shown in FIG. 14, respectively. That is, in FIG. 20, "alpha_L" corresponds to the first motion-compensated combination coefficient, and "alpha_M" corresponds to the second motion-compensated combination coefficient. Note that, "HDR1" corresponds to the T0-T1 combination signal (S0-S1 combination signal), and "HDR_OUT" corresponds to the combined image signal.

Figure 22:
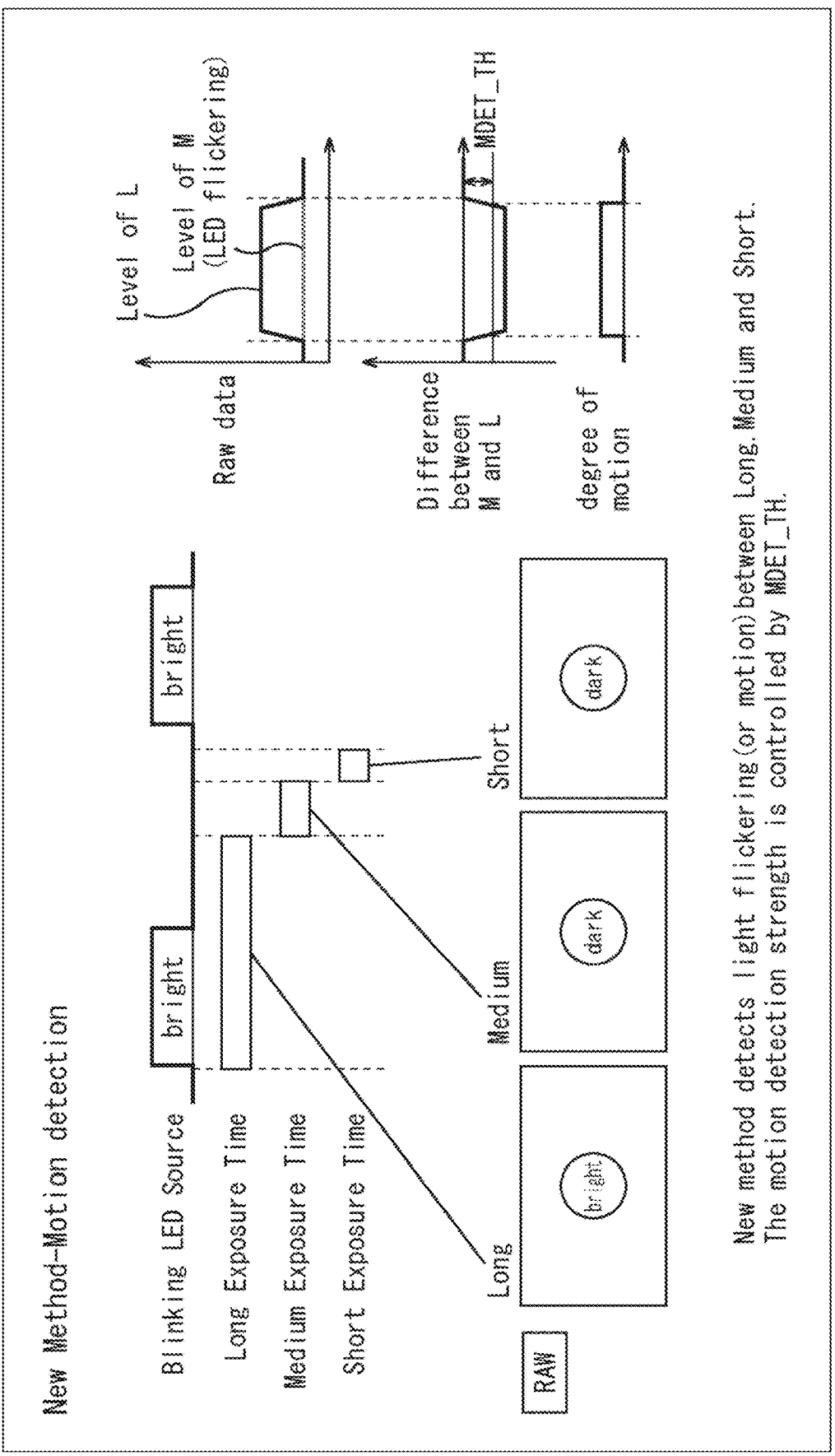
FIG. 22 is a diagram describing the detailed contents of signal processing of the present technology.

Here, for example, as illustrated in FIG. 22, in a case where the light-on state of the light source is recorded in the long accumulation image (L) and the light-on state of the light source is not recorded in the medium accumulation image (M) and the short accumulation image (S), the following processing is performed in the signal processing of the present technology. That is, in the signal processing of the present technology, for example, it is specified in which of the long accumulation image and the medium accumulation image the light-on state of the light source is included by taking a difference signal between the signal (Level of L) of the long accumulation image and the signal (Level of M) of the medium accumulation image, and the combination coefficient (blend rate) is changed according to the specification result.

Figure 23:
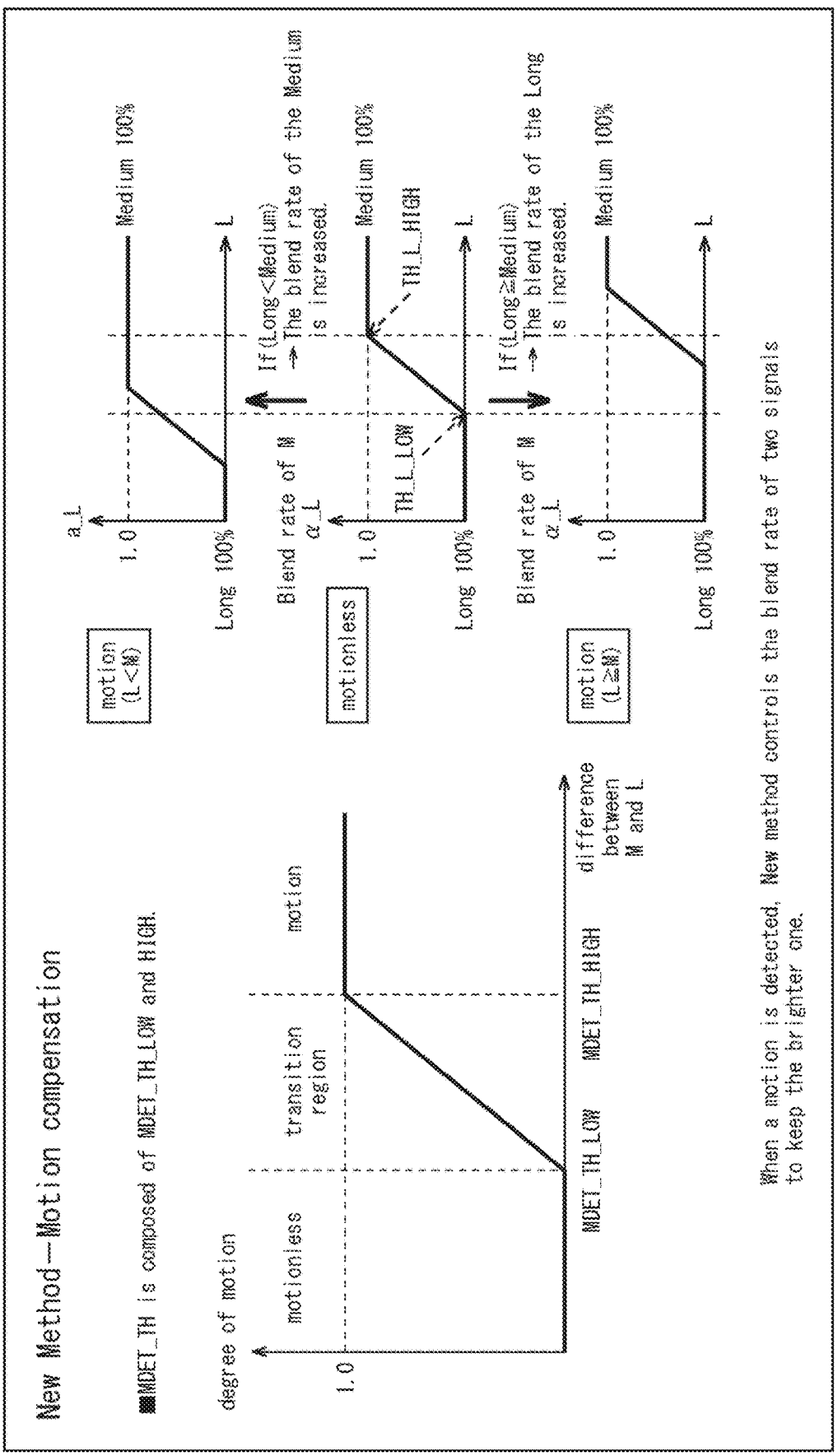
FIG. 23 is a diagram describing the detailed contents of signal processing of the present technology.

For example, as illustrated in FIG. 23, in the signal processing of the present technology, in a case where the signal of the long accumulation image is larger between the signal of the long accumulation image and the signal of the medium accumulation image (in a case where the light source is included in the long accumulation image), the combination proportion (blend rate) of the signal of the long accumulation image is increased. On the other hand, in the signal processing of the present technology, in a case where the signal of the medium accumulation image is larger between the signal of the long accumulation image and the signal of the medium accumulation image (in a case where the light source is included in the medium accumulation image), the combination proportion (blend rate) of the signal of the medium accumulation image is increased.

That is, the control of the combination proportion (blend rate) illustrated in FIG. 23 corresponds to, for example, the processing of step S60 in FIG. 15 that is executed by the first motion detection and combination coefficient calculation unit 142 ("Motion Detection1" in FIG. 20). Then, in the example illustrated in FIG. 22, the signal of the long accumulation image is larger between the signal of long accumulation image and the signal of the medium accumulation image (the light source is included in the long accumulation image). Accordingly, for the first combination coefficient, the combination proportion of the signal of the long accumulation image is increased, and the first motion-compensated combination coefficient is obtained.

As described above, according to the present technology, even under the high illuminance conditions in which whiteout of a subject occurs in the conventional technology, missing of the imaging of the light-on state of the high-speed blinking subject, such as an LED, does not occur while ensuring visibility from the bright portion to the dark portion. Therefore, it is possible to realize a recordable imaging apparatus.

Note that, the present technology can be applied to all imaging apparatuses, such as in-vehicle cameras and surveillance cameras. Note that, the imaging target is not limited to the LED traffic signal or the LED speed regulation sign, and an object having a very large difference in brightness, a blinking object (for example, a light emitting object blinking at high speed), and the like can be imaging targets.

<5. Configuration Example of Solid State Imaging Device>

The camera unit 10 illustrated in FIG. 7 can be configured as a stacked solid state imaging device, such as a back surface illumination type CMOS image sensor, for example.

Figure 24:
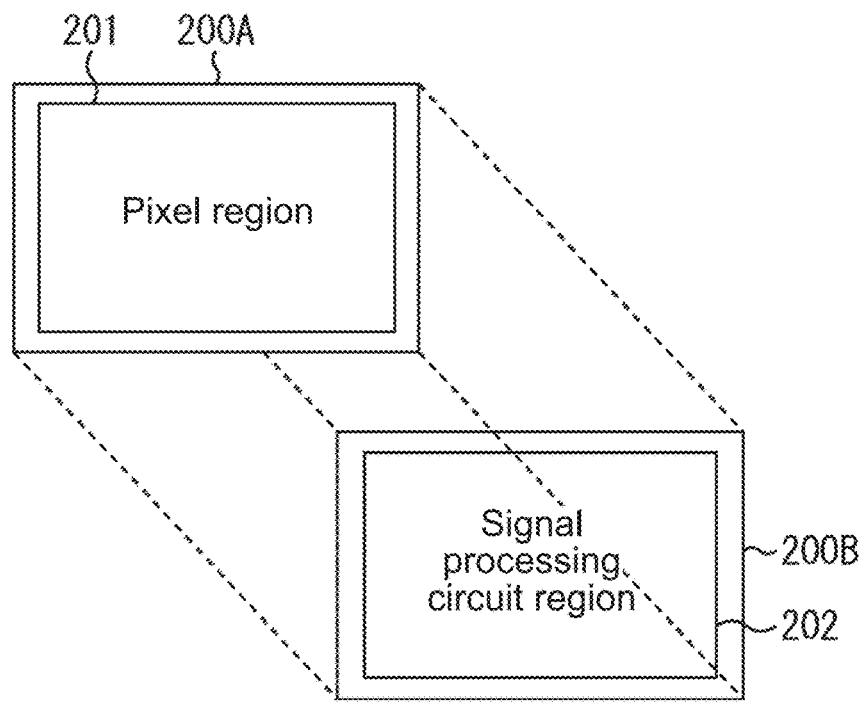
FIG. 24 is a diagram illustrating a configuration example of a stacked solid state imaging device.

Specifically, as illustrated in FIG. 24, it is possible to have a configuration in which a semiconductor substrate 200A, on which a pixel region 201 is formed, and a semiconductor substrate 200B, on which a signal processing circuit region 202 is formed, are stacked. Note that, in FIG. 24, the semiconductor substrate 200A and the semiconductor substrate 200B are electrically connected to each other by, for example, through vias or metal bonding.

Figure 25:
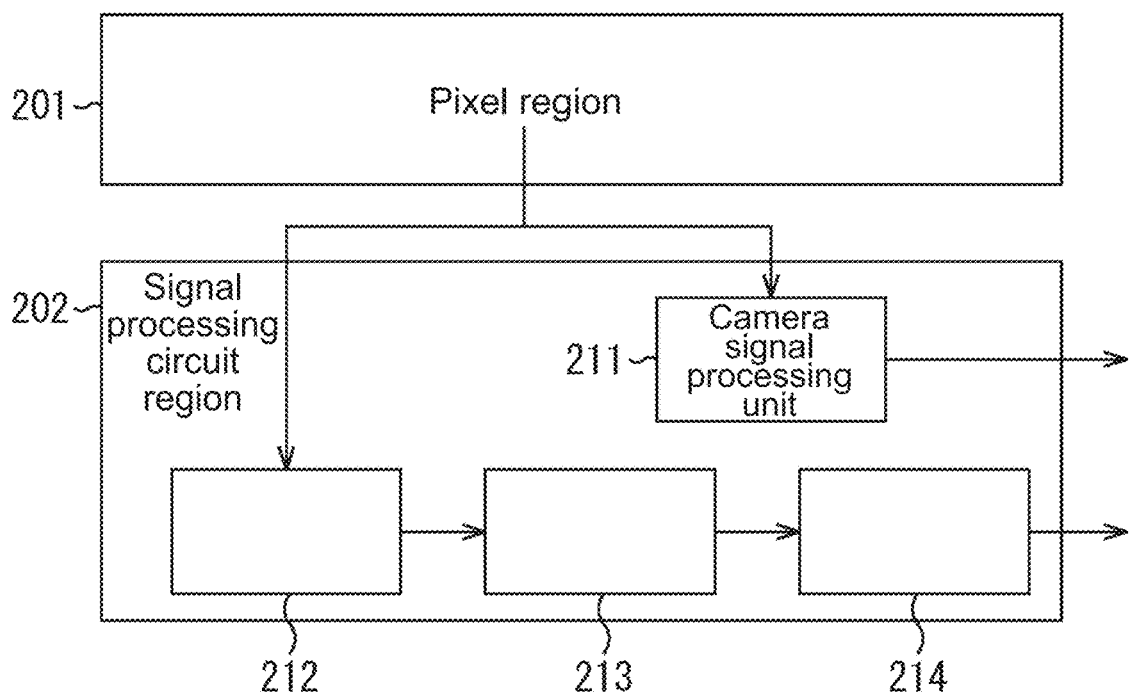
FIG. 25 is a diagram illustrating a detailed configuration example of a pixel region and a signal processing circuit region.

FIG. 25 illustrates a detailed configuration of the pixel region 201 and the signal processing circuit region 202 in FIG. 24. In FIG. 25, the signal processing circuit region 202 is configured to include a camera signal processing unit 211, signal processing units 212 to 214 for performing various kinds of signal processing, and the like.

Here, the camera signal processing unit 211 can be configured to include the above-described signal processing unit 104 (FIG. 7). That is, the camera signal processing unit 211 can perform the signal processing illustrated in the flowchart of FIG. 11 or the flowcharts of FIGS. 15 and 16. Note that, the camera signal processing unit 211 may include the delay line 103, the timing control unit 106, and the like. Note that, a pixel array portion of the imaging element 102 and the like are included in the pixel region 201.

Figure 26:
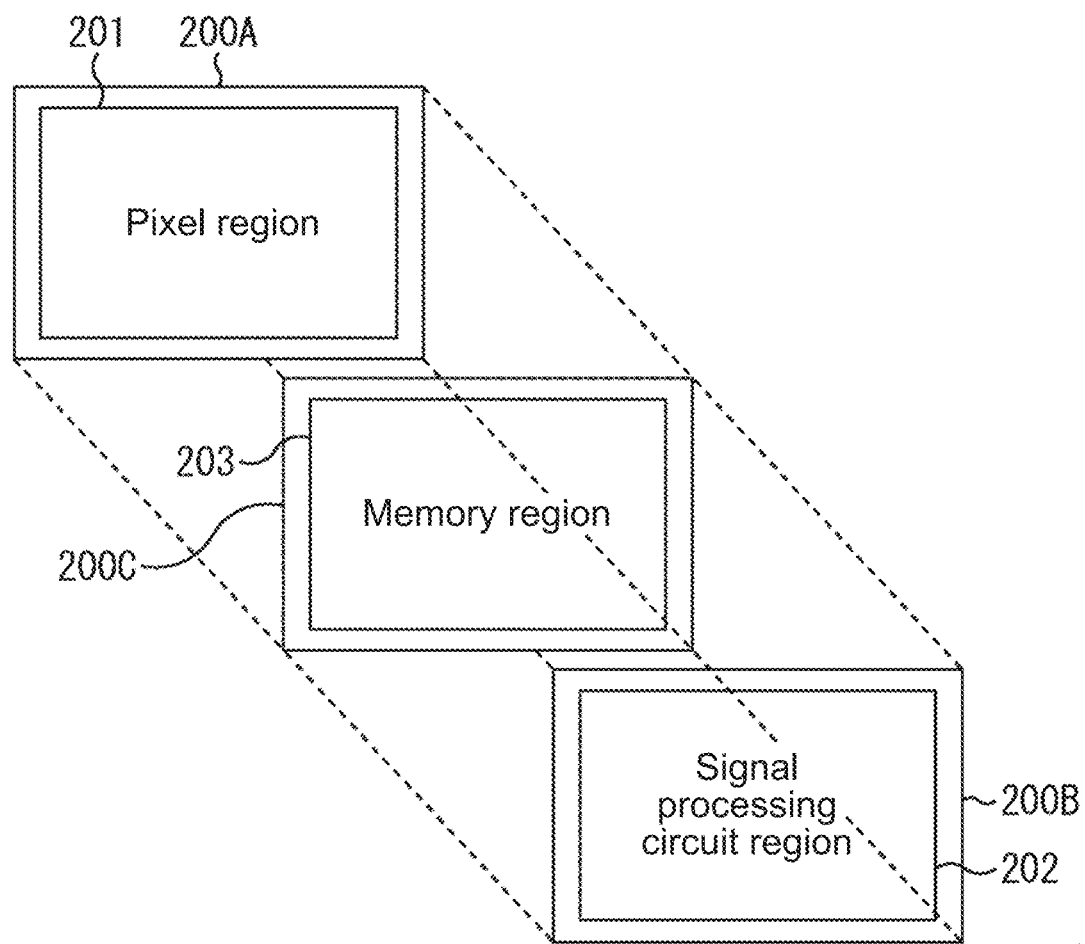
FIG. 26 is a diagram illustrating another configuration example of the stacked solid state imaging device.

Note that, as illustrated in FIG. 26, a semiconductor substrate 200C on which a memory region 203 is formed may be stacked between the semiconductor substrate 200A on which the pixel region 201 is formed and the semiconductor substrate 200B on which the signal processing circuit region 202 is formed.

Figure 27:
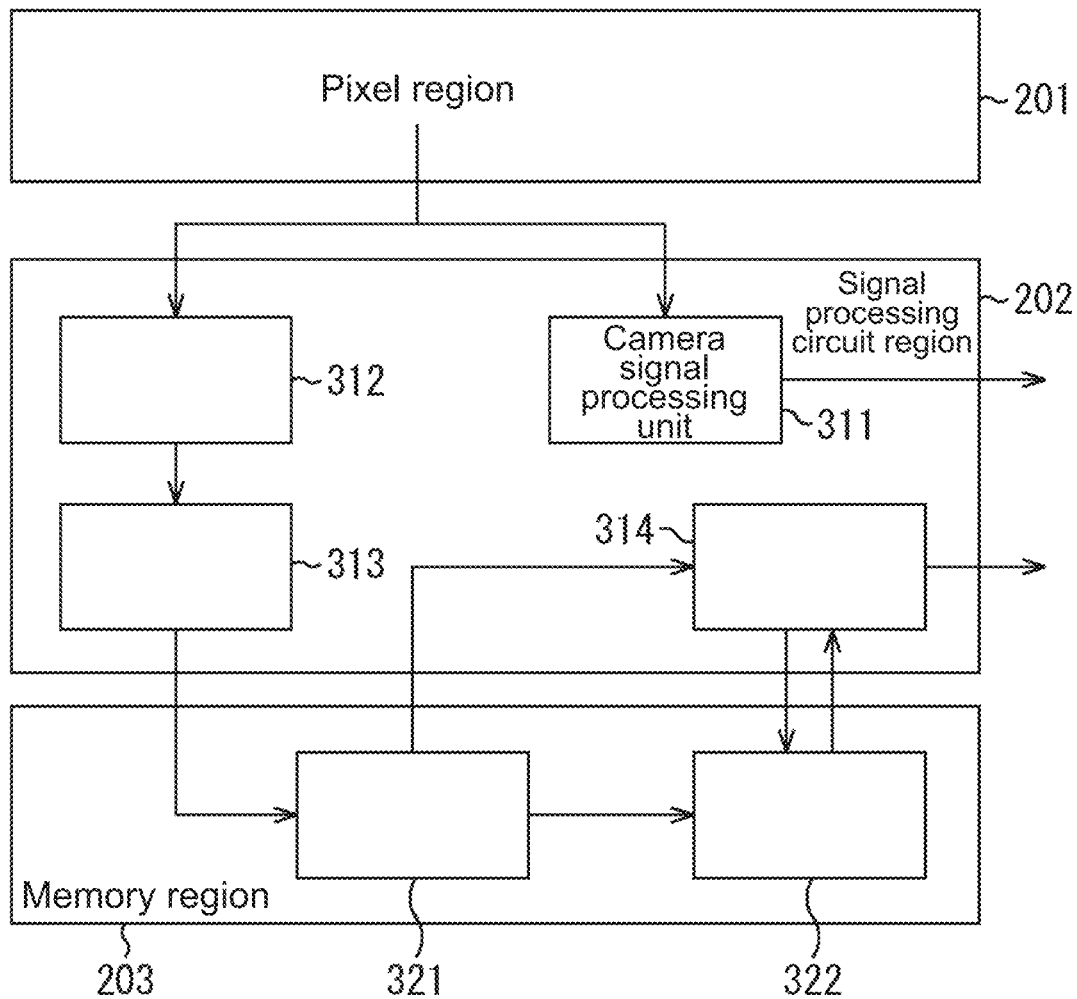
FIG. 27 is a diagram illustrating a detailed configuration example of a pixel region, a signal processing circuit region, and a memory region.

FIG. 27 illustrates a detailed configuration of the pixel region 201, the signal processing circuit region 202, and the memory region 203 in FIG. 26. In FIG. 27, the signal processing circuit region 202 is configured to include a camera signal processing unit 311, signal processing units 312 to 314 for performing various kinds of signal processing, and the like. Note that, the memory region 203 is configured to include memory units 321 to 322 and the like.

Here, similarly to the camera signal processing unit 211 illustrated in FIG. 25, the camera signal processing unit 311 is configured to include the signal processing unit 104 (FIG. 7) and the like. Note that, the delay line 103 may be included in the memory region 203 so that the delay line 103 sequentially stores image data from the pixel region 201 (imaging element 102), and the image data may be appropriately supplied to the camera signal processing unit 311 (signal processing unit 104).

<6. Configuration Example of Computer>

The above-described series of processes (the signal processing in FIG. 11 or the signal processing in FIGS. 15 and 16) can be executed by hardware or can be executed by software. In the case of executing the series of processes by software, a program of the software is installed on a computer. Here, examples of the computer include a computer built into dedicated hardware and a general-purpose personal computer capable of executing various functions by installing various programs.

Figure 28:
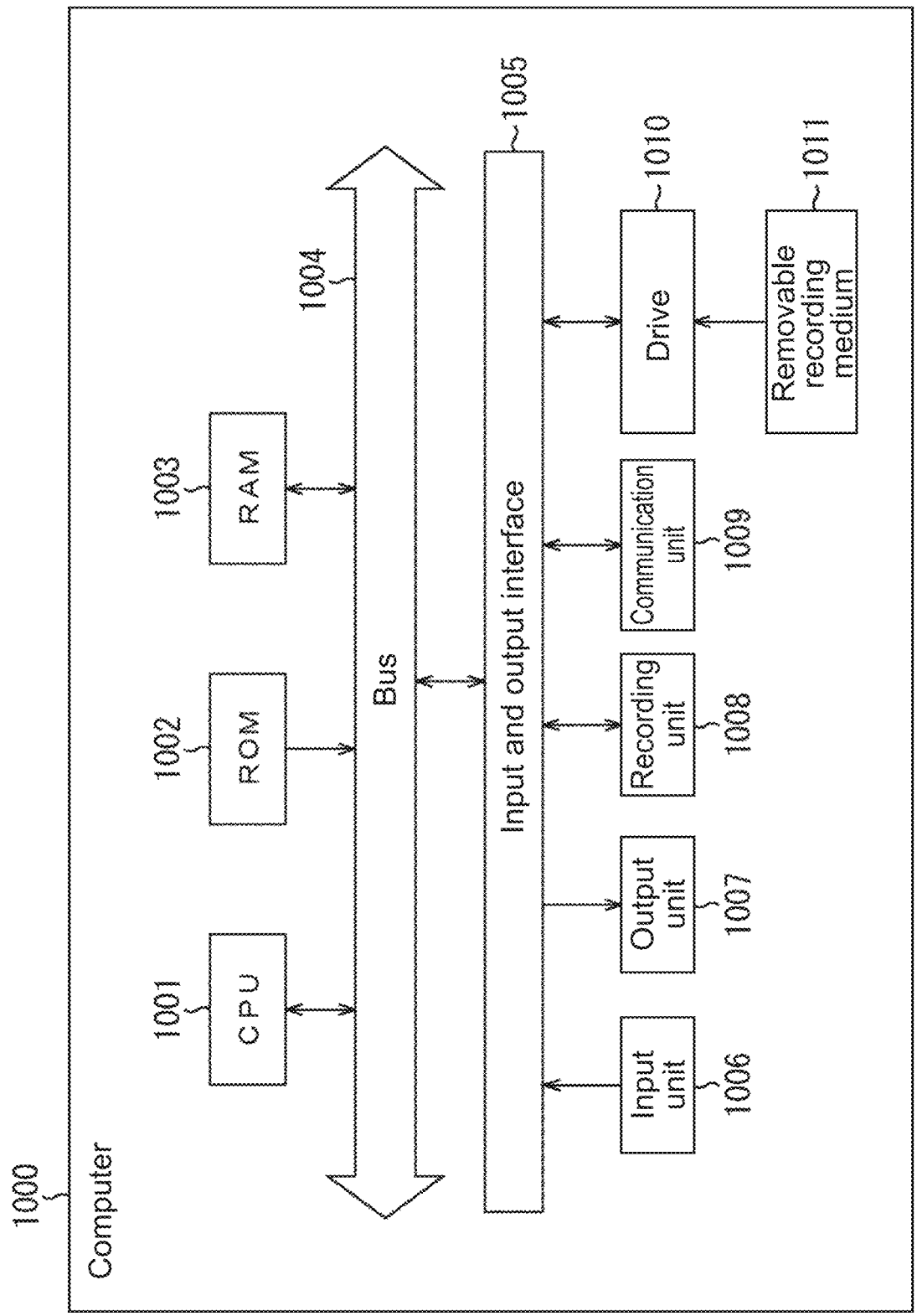
FIG. 28 is a diagram illustrating a configuration example of a computer.

FIG. 28 is a block diagram illustrating a configuration example of hardware of a computer that executes the above-described series of processes using a program.

In a computer 1000, a CPU (Central Processing Unit) 1001, a ROM (Read Only Memory) 1002, and a RAM (Random Access Memory) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011, such as a magnetic disk, an optical disc, a magneto-optical disk, or a semiconductor memory.

In the computer 1000 configured as described above, for example, the CPU 1001 loads a program stored in the recording unit 1008 to the RAM 1003 through the input and output interface 1005 and the bus 1004 and executes the program, so that the above-described series of processes are performed.

The program executed by the computer 1000 (CPU 1001) can be provided by being recorded on the removable recording medium 1011 as a package medium, for example. Note that, the program can be provided through a wired or wireless transmission medium, such as a local area network, the Internet, and digital satellite broadcasting.

In the computer 1000, the program can be installed on the recording unit 1008 through the input and output interface 1005 by mounting the removable recording medium 1011 on the drive 1010. Note that, the program can be received by the communication unit 1009 through a wired or wireless transmission medium and installed on the recording unit 1008. Note that, the program can be installed on the ROM 1002 or the recording unit 1008 in advance.

Note that, the program executed by the computer 1000 may be a program by which processes are performed in time series according to the order described in this specification, or may be a program by which processes are performed in parallel or at required timings, such as when a call is made.

Here, in this specification, processing steps that describe a program for causing the computer 1000 to perform various kinds of processing are not necessarily performed in time series according to the order described as a flowchart, and processes executed in parallel or individually (for example, parallel processing or processing according to an object) are also included.

Note that, the program may be processed by one computer, or may be processed in a distributed manner by a plurality of computers. Note that, the program may be transferred to a distant computer and executed.

Note that, in this specification, the system means a group of a plurality of constituent elements (apparatuses, modules (components), and the like), and it does not matter whether all constituent elements are in the same housing or not. Therefore, a plurality of apparatuses, which are housed in separate housings and are connected to each other through a network, and one apparatus, in which a plurality of modules are housed in one housing, are both systems.

Note that, embodiments of the present technology are not limited to the embodiment described above, and various modifications can be made without departing from the gist of the present technology. For example, the present technology can adopt a configuration of cloud computing in which one function is shared by a plurality of apparatuses through a network and processed jointly.

<7. Application Example>

The technology according to the present disclosure can be applied to various products. For example, the technology according to the present disclosure may be achieved as an apparatus mounted in any kind of mobile object such as an automobile, an electric car, a hybrid electric car, a motorcycle, a bicycle, a personal mobility device, an airplane, a drone, a ship, a robot, a construction machine, an agricultural machine (tractor), or the like.

Figure 29:
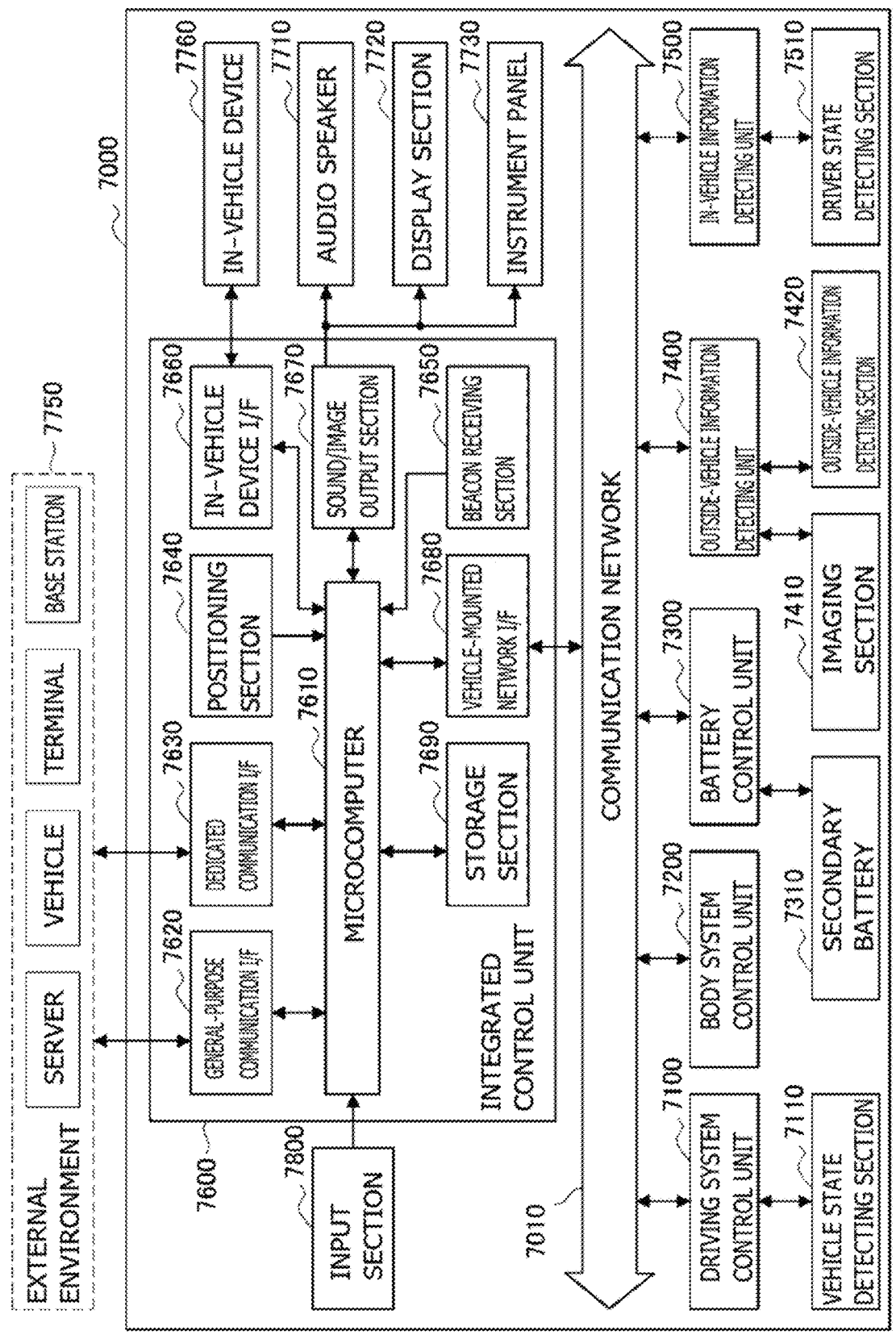
FIG. 29 is a block diagram depicting an example of schematic configuration of a vehicle control system.

FIG. 29 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 29, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 29 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 30:
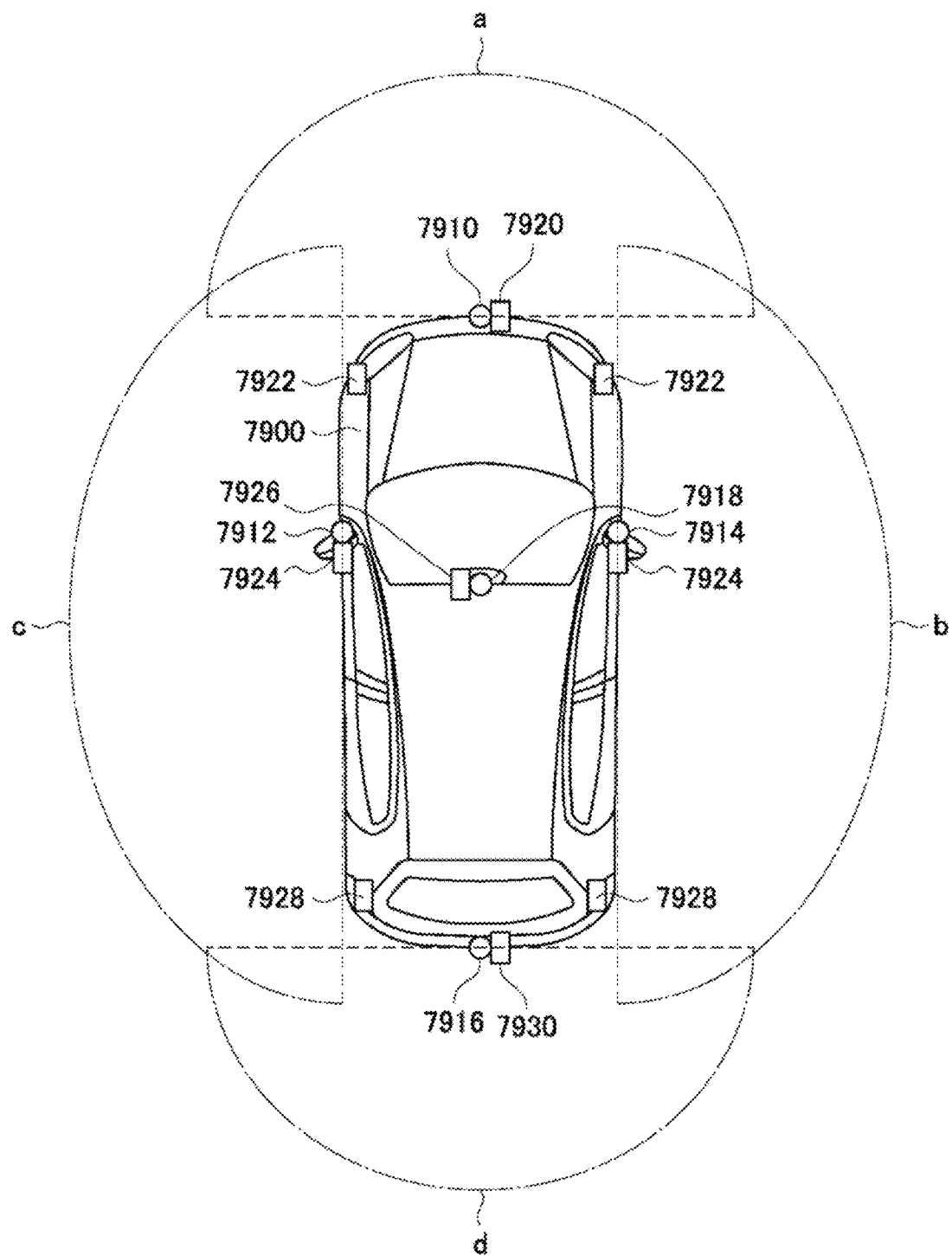
FIG. 30 is a diagram of assistance in explaining an example of installation positions of an outside-vehicle information detecting section and an imaging section.

FIG. 30 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 29, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 29, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 29 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for achieving each of the functions of the camera unit 10 according to the present embodiment described by using FIG. 7 can be implemented on any of the control units or the like. In addition, a computer-readable recording medium that stores the computer program can also be provided. The recording medium is, for example, a magnetic disk, an optical disc, a magneto-optical disk, a flash memory, or the like. In addition, the computer program may be distributed via a network without using the recording medium, for example.

In the vehicle control system 7000 described above, the camera unit 10 according to the present embodiment described by using FIG. 7 can be applied to the integrated control unit 7600 of the application example depicted in FIG. 29. For example, the signal processing unit 104 and the timing control unit 106 of the camera unit 10 correspond to the microcomputer 7610 of the integrated control unit 7600. For example, when combining a plurality of images captured with different exposure amounts, the integrated control unit 7600 blends the maximum value of each image considering the exposure ratio according to the difference amount of pixel values of the same coordinates, and when performing imaging with a plurality of different exposure amounts, the integrated control unit 7600 performs exposure control to make the exposure periods as close as possible to each other. As a result, it is possible to reliably image the imaging target that blinks (blinks at high speed) in a scene having a very large difference in brightness.

In addition, at least part of the constituent elements of the camera unit 10 described by using FIG. 7 may be achieved by a module (for example, integrated-circuit module including one die) for the integrated control unit 7600 illustrated in FIG. 29. Alternatively, the camera unit 10 described by using FIG. 7 may be achieved by the plurality of control units of the vehicle control system 7000 illustrated in FIG. 29.

Note that, the present technology can adopt the following configuration.

(1) A signal processing apparatus, including:
  a detection unit that detects a difference between a plurality of images captured with different exposure times;
  a combination coefficient calculation unit that calculates a combination coefficient indicating a combination ratio between the plurality of images on the basis of the difference; and
  a combination unit that combines the plurality of images on the basis of the combination coefficient.

(2) The signal processing apparatus according to (1), further including
  a control unit that controls the exposure times of the plurality of images, in which
  the plurality of images include a first image having a first exposure time and a second image having a second exposure time different from the first exposure time, and
  the control unit performs control to capture the second image subsequently to the first image and minimizes an interval between an exposure end of the first image and an exposure start of the second image.

(3) The signal processing apparatus according to (2), in which
  the control unit makes the first exposure time longer than the second exposure time.

(4) The signal processing apparatus according to any one of (1) to (3), further including
  a combination reference signal generation unit that generates a combination reference signal of each of the plurality of images, in which
  the detection unit detects the difference on the basis of the combination reference signal.

(5) The signal processing apparatus according to (4), in which
  the combination coefficient calculation unit calculates a medium combination coefficient on the basis of the combination reference signal, and calculates the combination coefficient on the basis of the medium combination coefficient and the difference.

(6) The signal processing apparatus according to (4) or (5), in which
  the combination reference signal generation unit generates a first combination reference signal corresponding to the first image and a second combination reference signal corresponding to the second image,
  the detection unit detects a magnitude relationship between the first combination reference signal and the second combination reference signal as the difference, and
  the combination coefficient calculation unit calculates the combination coefficient such that a combination proportion of an image corresponding to a larger combination reference signal of the first combination reference signal and the second combination reference signal is higher.

(7) The signal processing apparatus according to any one of (4) to (6), in which
  the combination reference signal is a brightness value.

(8) The signal processing apparatus according to (2), in which
  the plurality of images further include a third image having a third exposure time different from both the first exposure time and the second exposure time, and
  the control unit performs control to capture the third image subsequently to the second image and minimizes an interval between an exposure end of the second image and an exposure start of the third image.

(9) The signal processing apparatus according to (8), in which
  the control unit controls the first exposure time to be longer than the second exposure time and the second exposure time to be longer than the third exposure time, and
  the combination unit combines the third image with an intermediate composite image obtained by combining the first image and the second image.

(10) The signal processing apparatus according to (9), in which
  the combination coefficient calculation unit calculates a first combination coefficient indicating a combination ratio between the first image and the second image and a second combination coefficient indicating a combination ratio between the intermediate composite image and the third image, and
  the combination unit combines the first image and the second image on the basis of the first combination coefficient, and combines the intermediate composite image and the third image on the basis of the second combination coefficient.

(11) The signal processing apparatus according to (2), in which
  the control unit controls a total time of the exposure times of the plurality of images to be longer than a light-off time of a blinking subject.

(12) An imaging apparatus, including:
  an image generation unit that generates a plurality of images captured with different exposure times;
  a detection unit that detects a difference between the plurality of images;
  a combination coefficient calculation unit that calculates a combination coefficient indicating a combination ratio between the plurality of images on the basis of the difference; and
  a combination unit that combines the plurality of images on the basis of the combination coefficient.

(13) A signal processing method, including:
  detecting a difference between a plurality of images captured with different exposure times;
  calculating a combination coefficient indicating a combination ratio between the plurality of images on the basis of the difference; and
  combining the plurality of images on the basis of the combination coefficient.

REFERENCE SIGNS LIST 10 camera unit
101 lens 102 imaging element
103 delay line
104 signal processing unit
105 output unit
106 timing control unit
121 combination reference signal generation unit
122 combination coefficient calculation unit
123 motion detection unit
124 combination coefficient modulation unit
125 combination unit
141 combination reference signal generation unit
142 first motion detection and combination coefficient calculation unit
143 first combination unit
144 second motion detection and combination coefficient calculation unit
145 second combination unit
161 combination reference signal generation unit
162 first combination coefficient calculation unit
163 second combination coefficient calculation unit
164 motion detection and combination coefficient calculation unit
165 maximum value selection unit
166 first combination unit
167 second combination unit
168 third combination unit
201 pixel region
202 signal processing circuit region
203 memory region
211 camera signal processing unit
311 camera signal processing unit
1000 computer
1001 CPU
7000 vehicle control system
7600 integrated control unit
7610 microcomputer

The invention claimed is:
1. A signal processing apparatus, comprising:
processing circuitry configured to:
detect a difference between a plurality of images captured with different exposure times;
calculate a combination coefficient indicating a combination ratio between the plurality of images on a basis of the difference;
combine the plurality of images on a basis of the combination coefficient;
generate a combination reference signal of each of the plurality of images;
detect the difference on a basis of the combination reference signal;
generate a first combination reference signal corresponding to the first image and a second combination reference signal corresponding to the second image;
detect a magnitude relationship between the first combination reference signal and the second combination reference signal as the difference; and
calculate the combination coefficient such that a combination proportion of an image corresponding to a larger combination reference signal of the first combination reference signal and the second combination reference signal is higher.
2. The signal processing apparatus according to claim 1, wherein the processing circuitry is further configured to:
control the exposure times of the plurality of images, wherein
the plurality of images include a first image having a first exposure time and a second image having a second exposure time different from the first exposure time, and
perform control to capture the second image subsequently to the first image and minimizes an interval between an exposure end of the first image and an exposure start of the second image.
3. The signal processing apparatus according to claim 2, wherein
the processing circuitry is configured to make the first exposure time longer than the second exposure time.
4. The signal processing apparatus according to claim 2, wherein
the plurality of images further include a third image having a third exposure time different from both the first exposure time and the second exposure time, and
the processing circuitry is configured to perform control to capture the third image subsequently to the second image and minimizes an interval between an exposure end of the second image and an exposure start of the third image.
5. The signal processing apparatus according to claim 4, wherein the processing circuitry is configured to:
control the first exposure time to be longer than the second exposure time and the second exposure time to be longer than the third exposure time, and
combine the third image with an intermediate composite image obtained by combining the first image and the second image.
6. The signal processing apparatus according to claim 5, wherein the processing circuitry is configured to:
calculate a first combination coefficient indicating a combination ratio between the first image and the second image and a second combination coefficient indicating a combination ratio between the intermediate composite image and the third image,
combine the first image and the second image on a basis of the first combination coefficient, and
combine the intermediate composite image and the third image on a basis of the second combination coefficient.
7. The signal processing apparatus according to claim 2, wherein
the processing circuitry is configured to control a total time of the exposure times of the plurality of images to be longer than a light-off time of a blinking subject.
8. The signal processing apparatus according to claim 1, wherein the processing circuitry is configured to:
calculate a medium combination coefficient on a basis of the combination reference signal, and calculates the combination coefficient on a basis of the medium combination coefficient and the difference.
9. The signal processing apparatus according to claim 1, wherein
the combination reference signal is a brightness value.
10. An imaging apparatus, comprising:
an imaging element configured to generate a plurality of images captured with different exposure times; and
processing circuitry configured to:
detect a difference between the plurality of images;
calculate a combination coefficient indicating a combination ratio between the plurality of images on a basis of the difference;
combine the plurality of images on a basis of the combination coefficient;
generate a combination reference signal of each of the plurality of images;

detect the difference on a basis of the combination reference signal;
generate a first combination reference signal corresponding to the first image and a second combination reference signal corresponding to the second image;
detect a magnitude relationship between the first combination reference signal and the second combination reference signal as the difference; and
calculate the combination coefficient such that a combination proportion of an image corresponding to a larger combination reference signal of the first combination reference signal and the second combination reference signal is higher.

11. A signal processing method, comprising:
detecting a difference between a plurality of images captured with different exposure times;
calculating a combination coefficient indicating a combination ratio between the plurality of images on a basis of the difference;
combining the plurality of images on a basis of the combination coefficient;
generating a combination reference signal of each of the plurality of images;
detecting the difference on a basis of the combination reference signal;
generating a first combination reference signal corresponding to the first image and a second combination reference signal corresponding to the second image;
detecting a magnitude relationship between the first combination reference signal and the second combination reference signal as the difference; and
calculating the combination coefficient such that a combination proportion of an image corresponding to a larger combination reference signal of the first combination reference signal and the second combination reference signal is higher.

* * * * *